(12) United States Patent  
Dibdin

(10) Patent No.: US 7,114,905 B2  
(45) Date of Patent: Oct. 3, 2006

(54) METHODS AND APPARATUS FOR LOADING A TRAILER

(75) Inventor: Peter Dibdin, Scunthorpe (GB)

(73) Assignee: Insulated Structures Limited, North Lincolnshire (GB)

( * ) Notice: Subject to any disclaimer, the term of this patent is extended or adjusted under 35 U.S.C. 154(b) by 0 days.

(21) Appl. No.: 10/203,881

(22) PCT Filed: Jan. 25, 2001

(86) PCT No.: PCT/GB01/00279

§ 371 (c)(1),
(2), (4) Date: Nov. 26, 2002

(87) PCT Pub. No.: WO01/62542

PCT Pub. Date: Aug. 30, 2001

(65) Prior Publication Data

US 2003/0133774 A1 Jul. 17, 2003

(30) Foreign Application Priority Data

Feb. 21, 2000 (GB) .................... 0003866.1
May 20, 2000 (GB) .................... 0012344.8

(51) Int. Cl.
*B60P 1/02* (2006.01)
(52) U.S. Cl. ................. 414/495; 414/679
(58) Field of Classification Search ........... 414/495, 414/545, 679, 812; 410/28, 29.1, 89, 143
See application file for complete search history.

(56) References Cited

U.S. PATENT DOCUMENTS

| 4,642,018 | A | * | 2/1987 | Leroux et al. ............ 414/502 |
|---|---|---|---|---|
| 4,750,859 | A | * | 6/1988 | Oren et al. ............... 414/812 |
| 5,092,721 | A | | 3/1992 | Prince |
| 5,443,350 | A | * | 8/1995 | Wilson .................... 414/495 |
| 5,452,972 | A | * | 9/1995 | Adams ..................... 410/89 |
| 5,525,026 | A | * | 6/1996 | DeMonte et al. ......... 414/542 |
| 5,730,578 | A | * | 3/1998 | Smidler ................... 414/495 |
| 5,807,047 | A | * | 9/1998 | Cox ........................ 410/152 |
| 5,836,636 | A | * | 11/1998 | Adams ..................... 296/24.4 |
| 5,915,913 | A | | 6/1999 | Greenlaw et al. |
| 5,931,262 | A | * | 8/1999 | Greenlaw et al. ......... 187/244 |
| 6,062,780 | A | * | 5/2000 | Petelka .................... 410/89 |
| 6,464,446 | B1 | * | 10/2002 | Hurler ..................... 414/545 |
| 6,474,446 | B1 | * | 11/2002 | Greenlaw et al. ......... 187/244 |

FOREIGN PATENT DOCUMENTS

| EP | 0 233 004 | 8/1987 |
|---|---|---|
| EP | 0 278 558 A1 | 8/1988 |
| EP | 0 611 245 A2 | 8/1994 |
| EP | 0 624 491 A1 | 11/1994 |
| FR | 1 353 904 | 6/1964 |
| FR | 2 530 558 | 1/1984 |
| GB | 0 405 568 | 2/1934 |
| GB | 903229 | 8/1962 |
| JP | 61-155037 | 7/1986 |
| WO | WO88/00538 | 1/1988 |

* cited by examiner

Primary Examiner—James W. Keenan
(74) Attorney, Agent, or Firm—Squire, Sanders Dempsey LLP

(57) ABSTRACT

Methods and apparatus are provided that load goods into trailers. The apparatus facilitates the loading of goods into the trailer, and optimizes usage of storage space in the trailer.

5 Claims, 23 Drawing Sheets

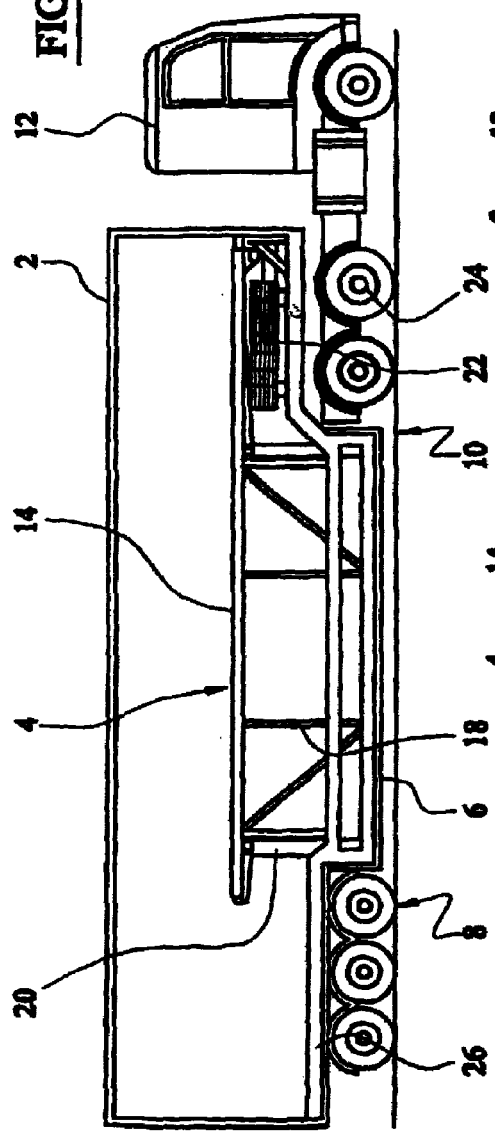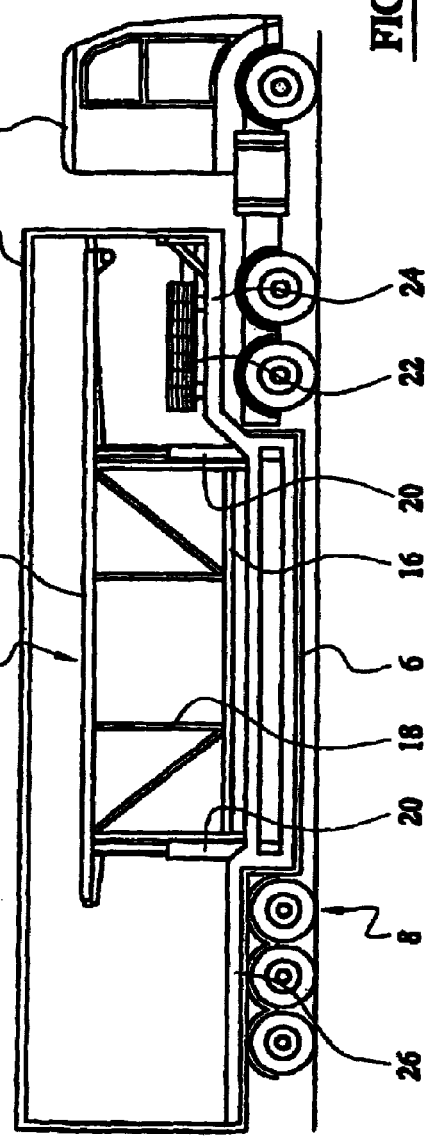

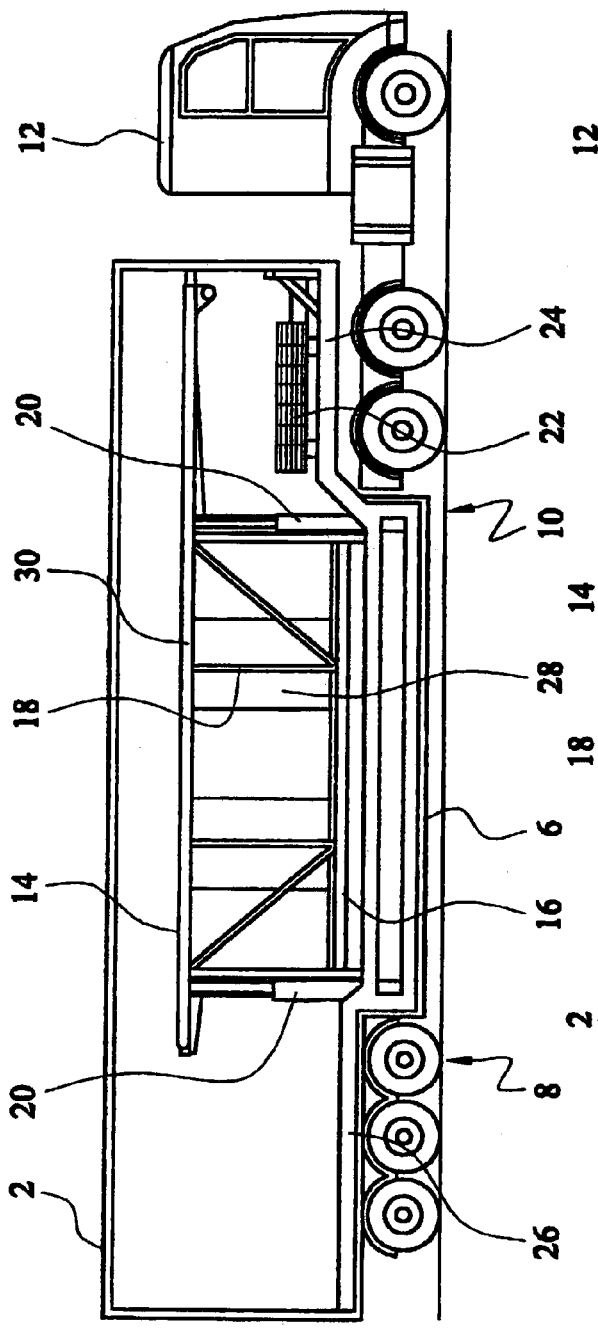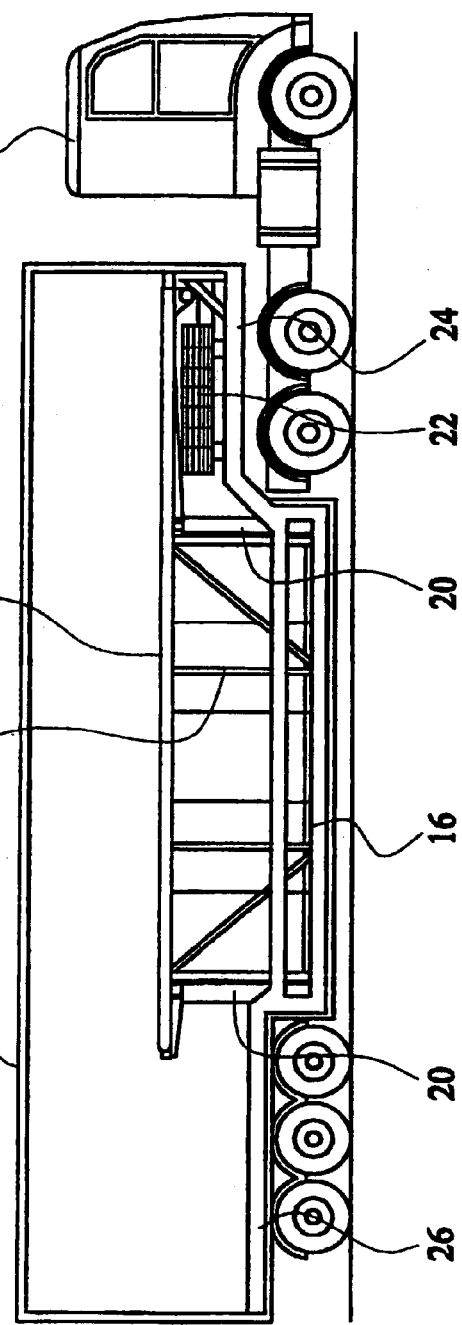
FIG. 3a
FIG. 3b

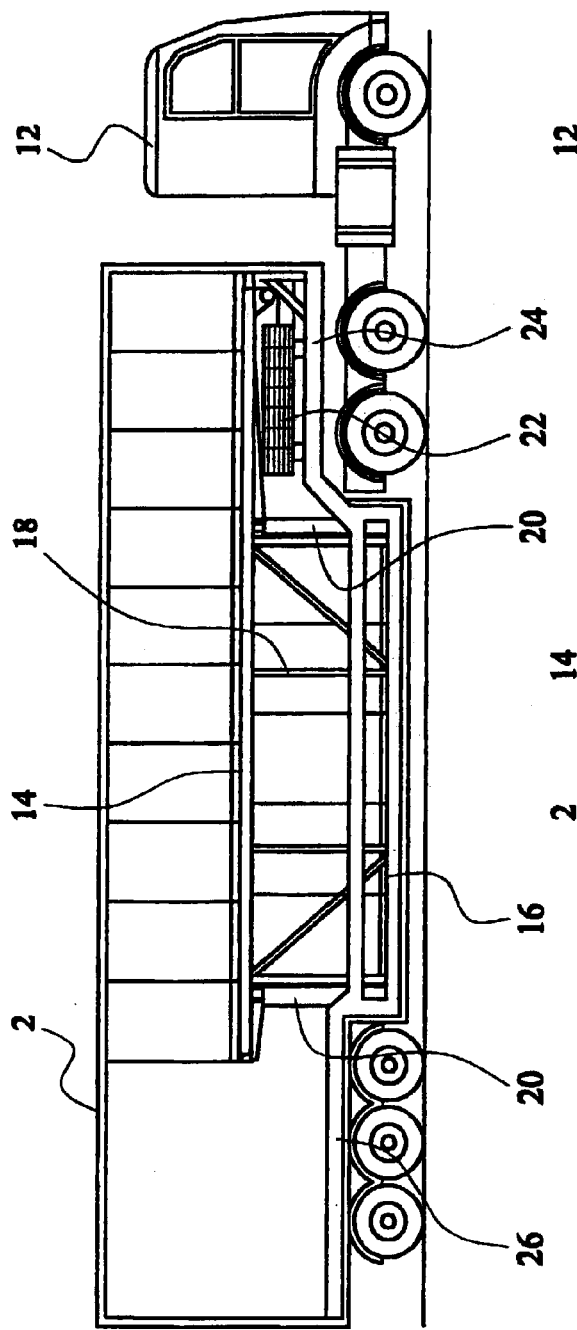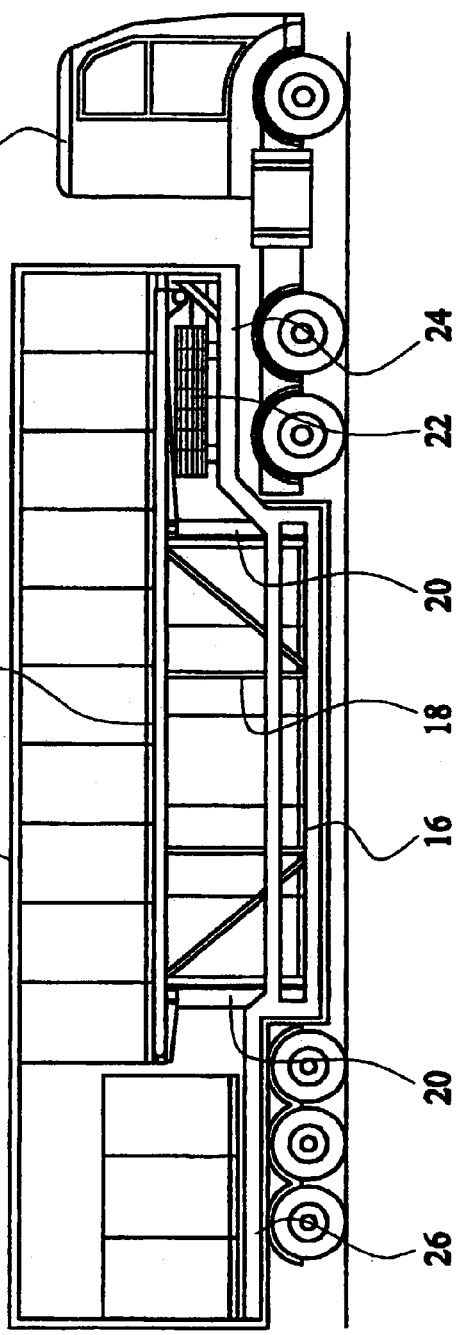

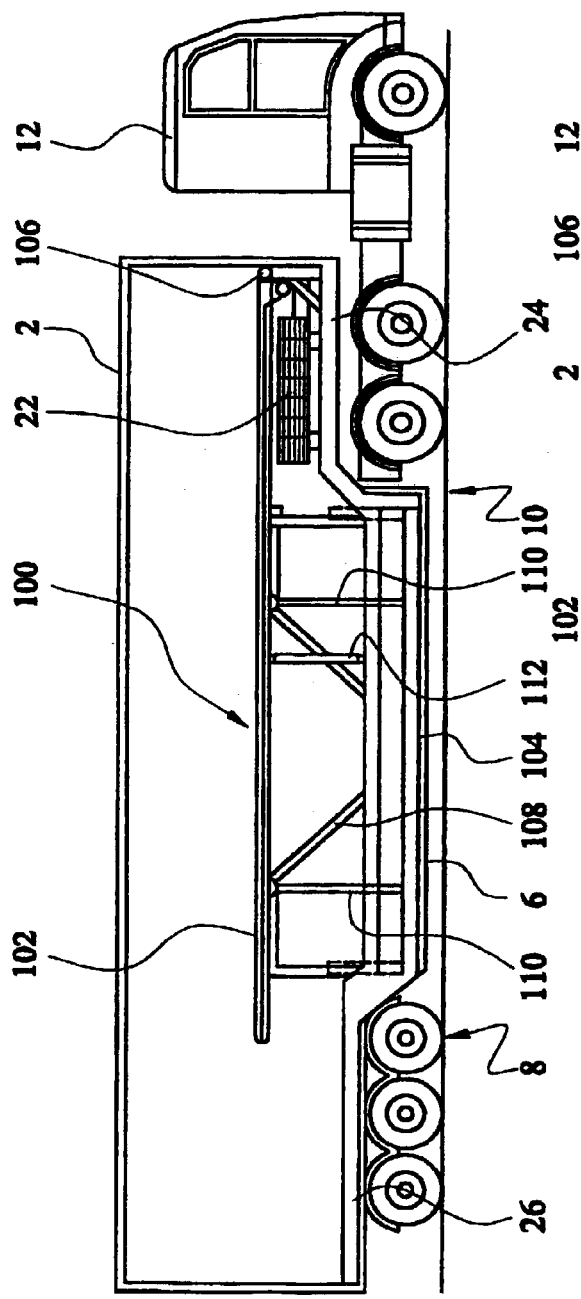
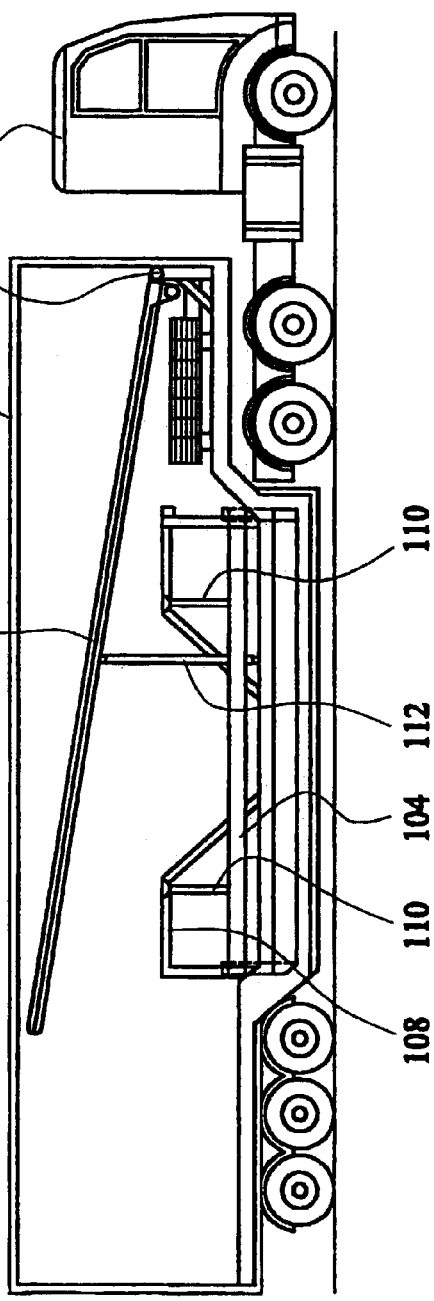

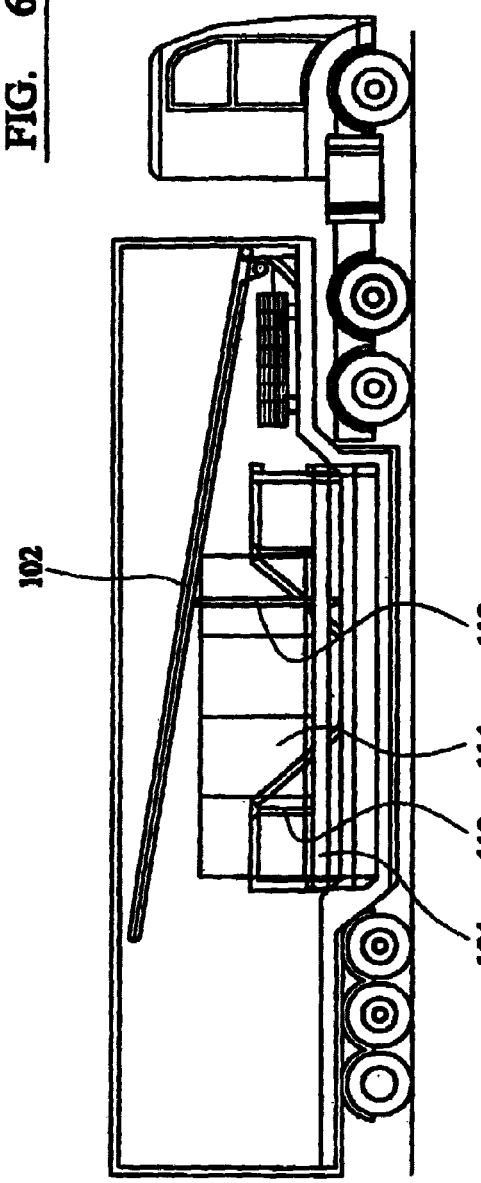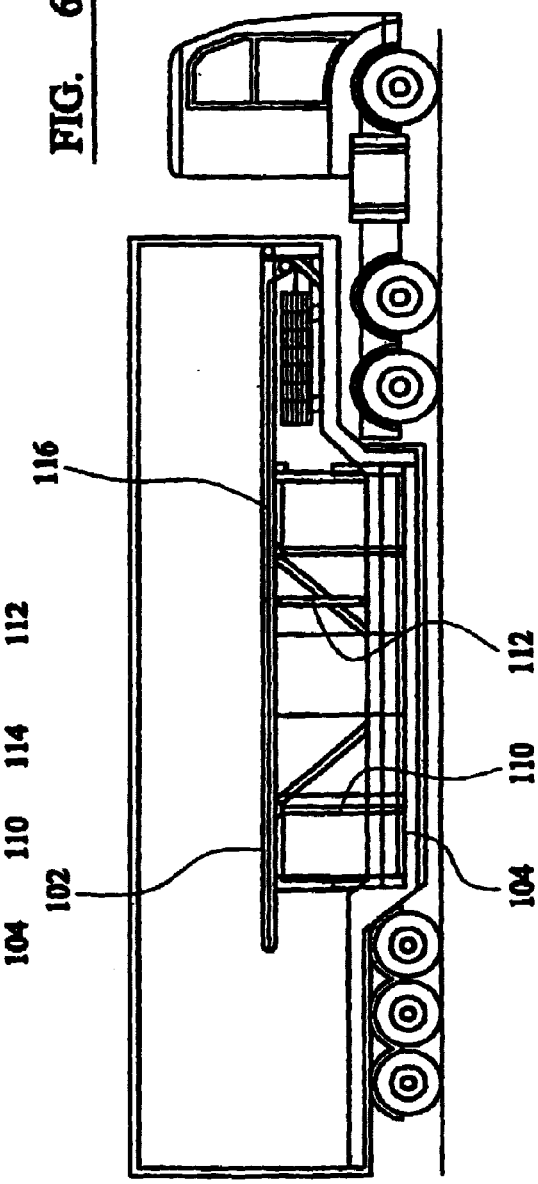

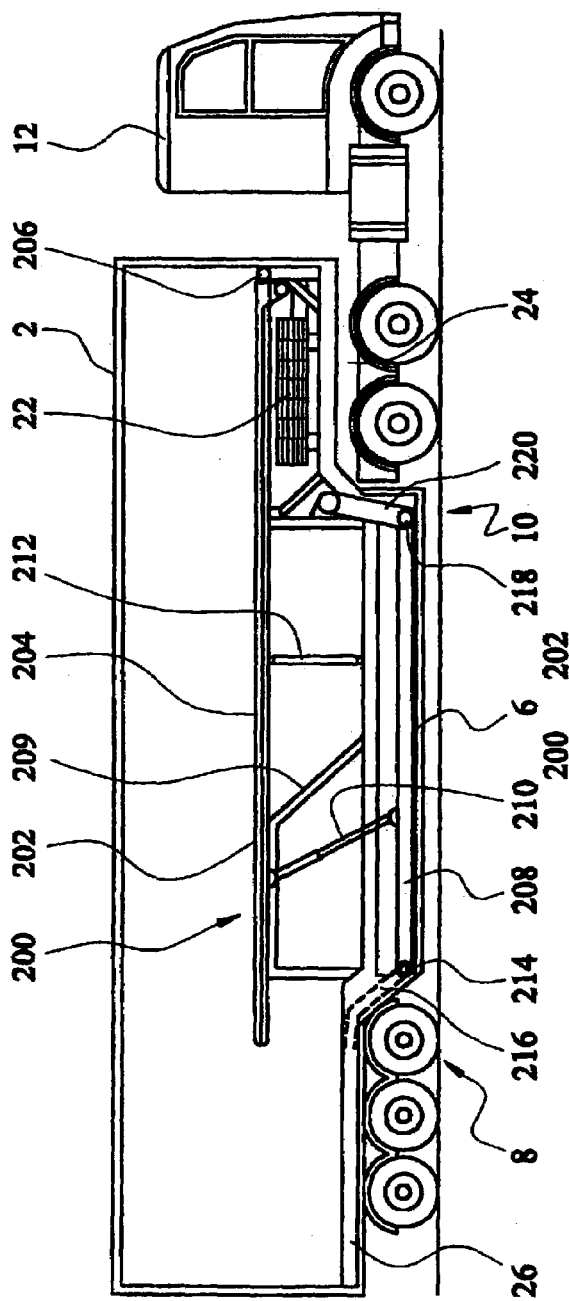
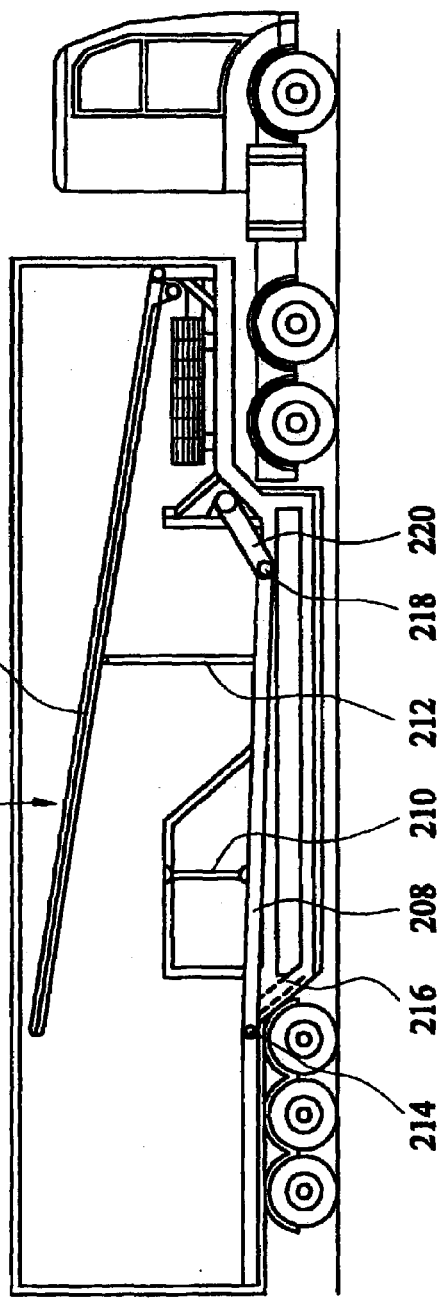
FIG. 7
FIG. 8

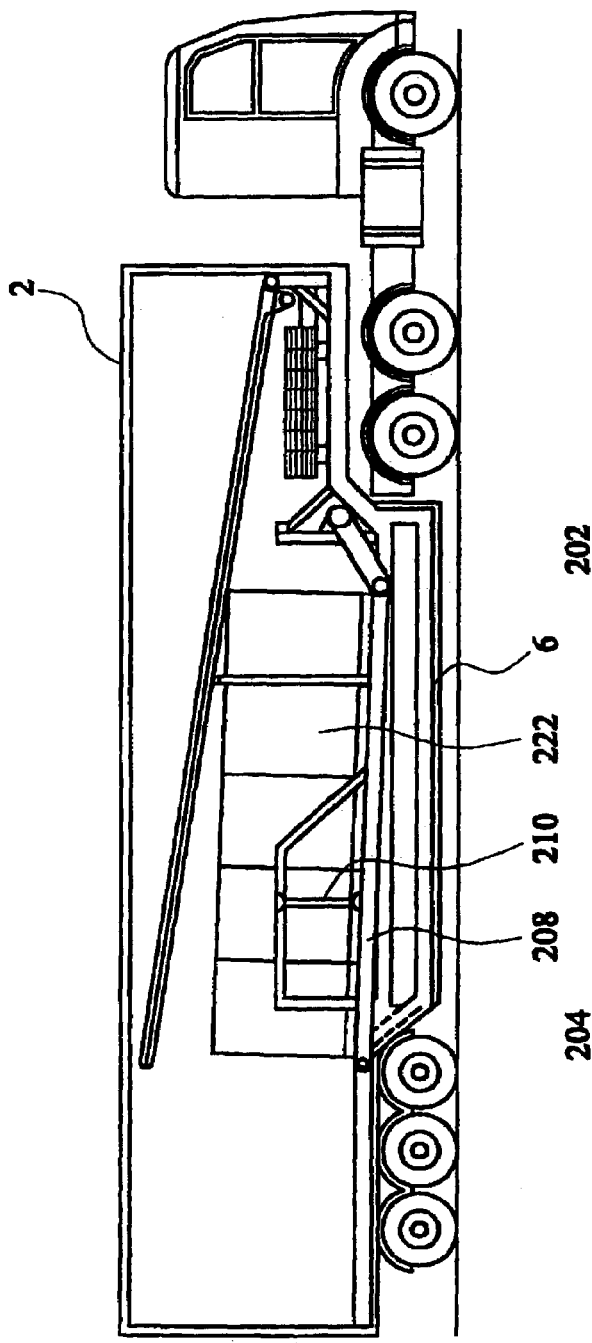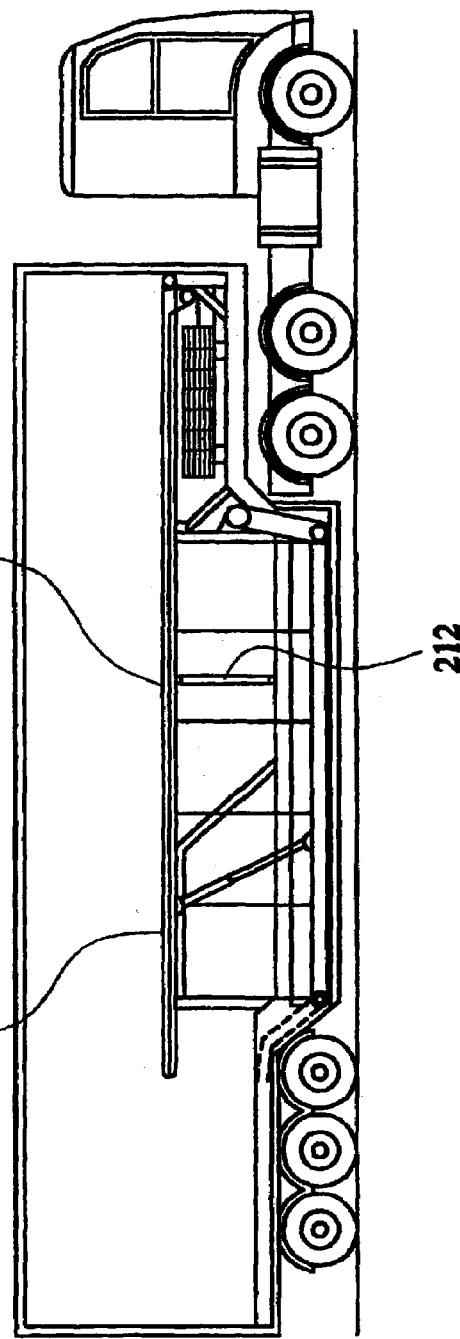

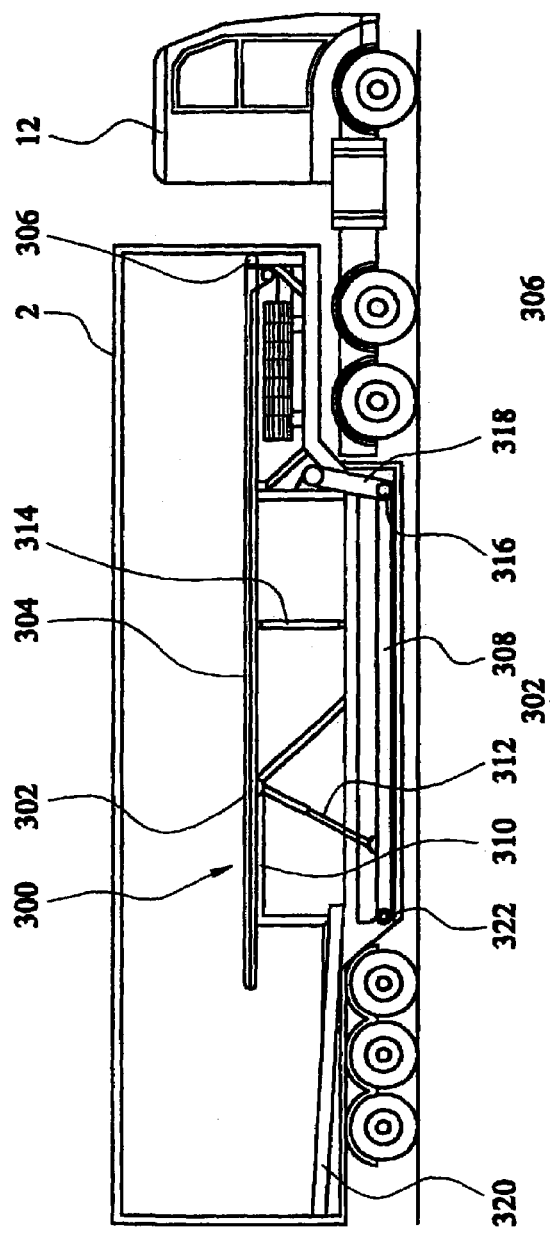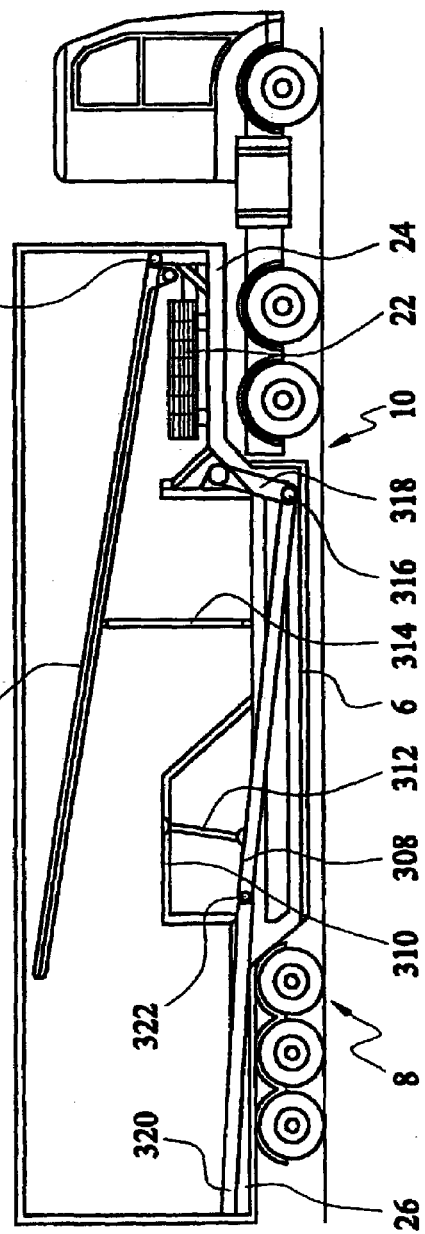

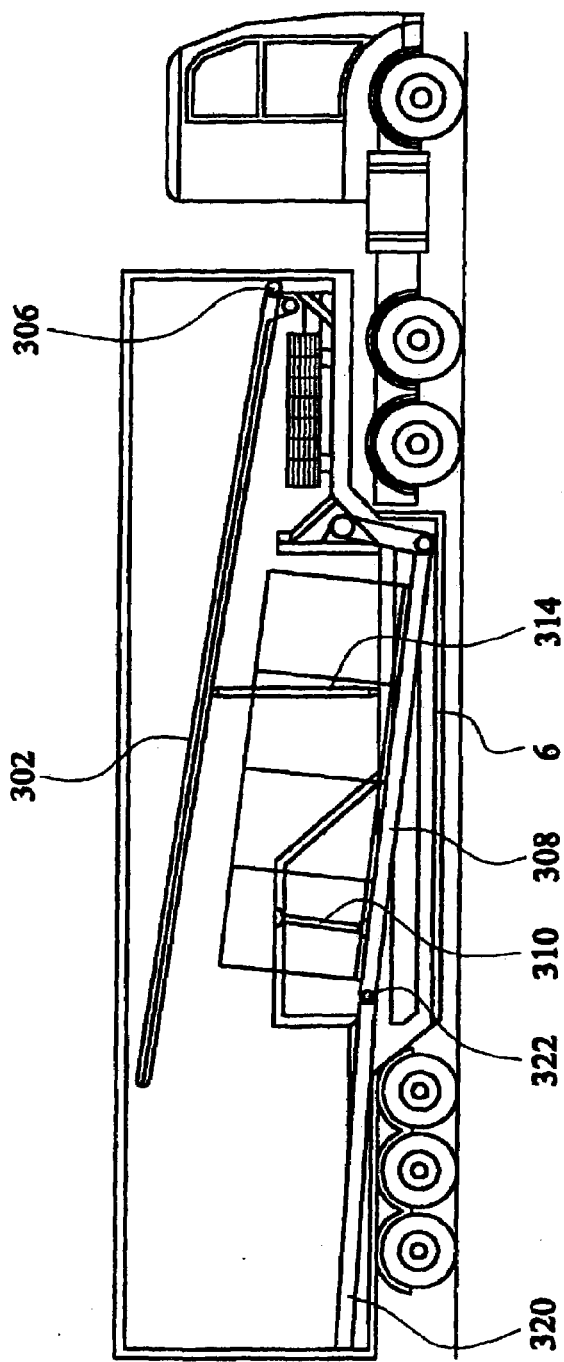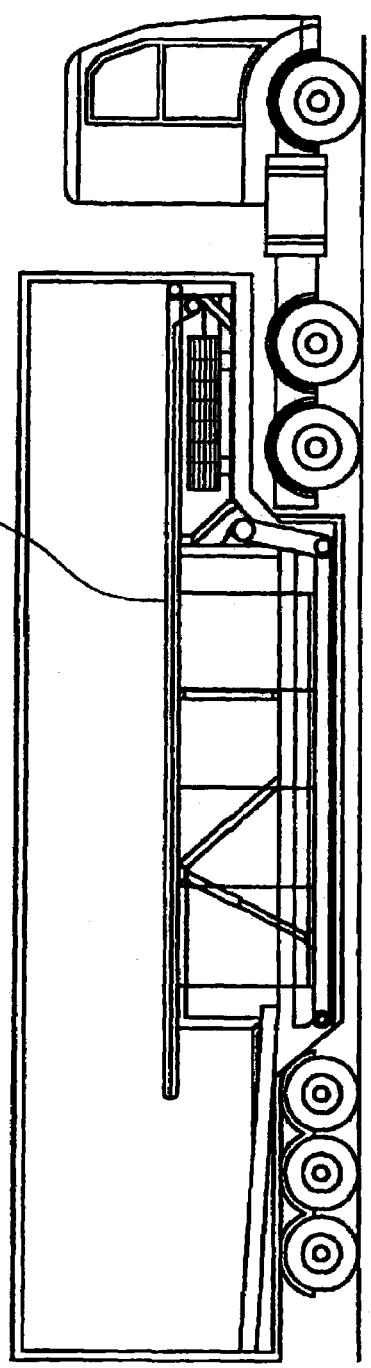
FIG. 12a
FIG. 12b

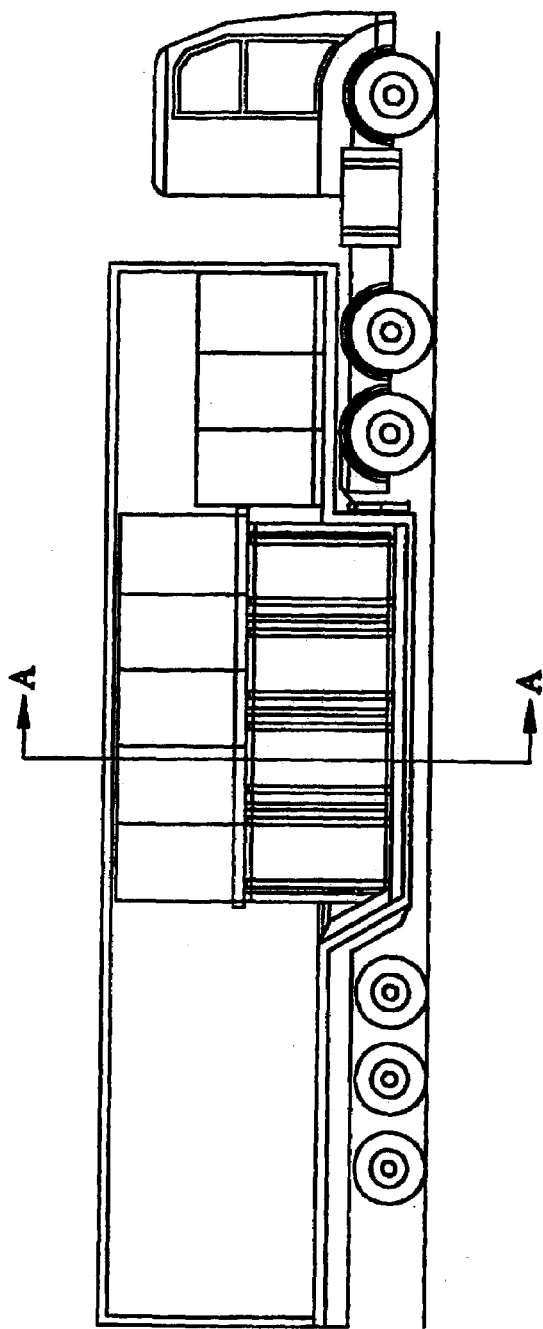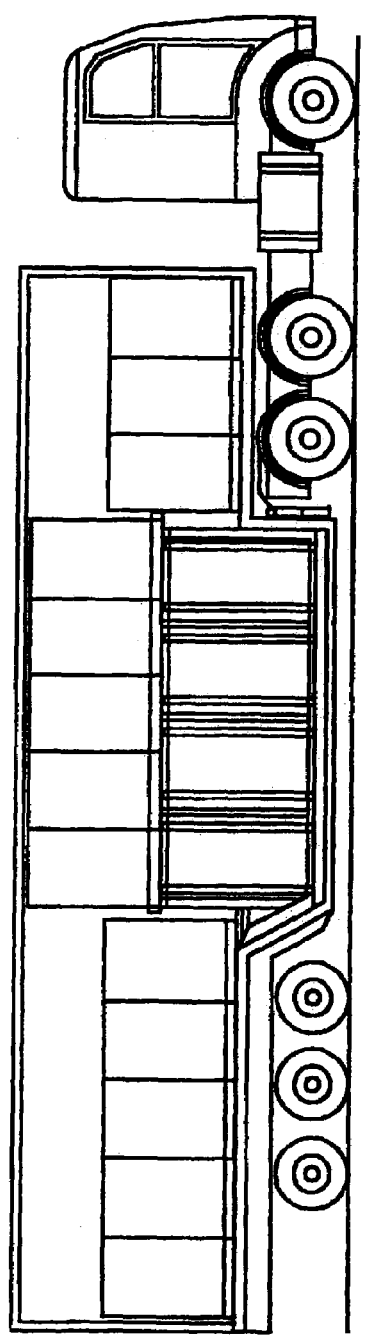
FIG. 16c
FIG. 16d

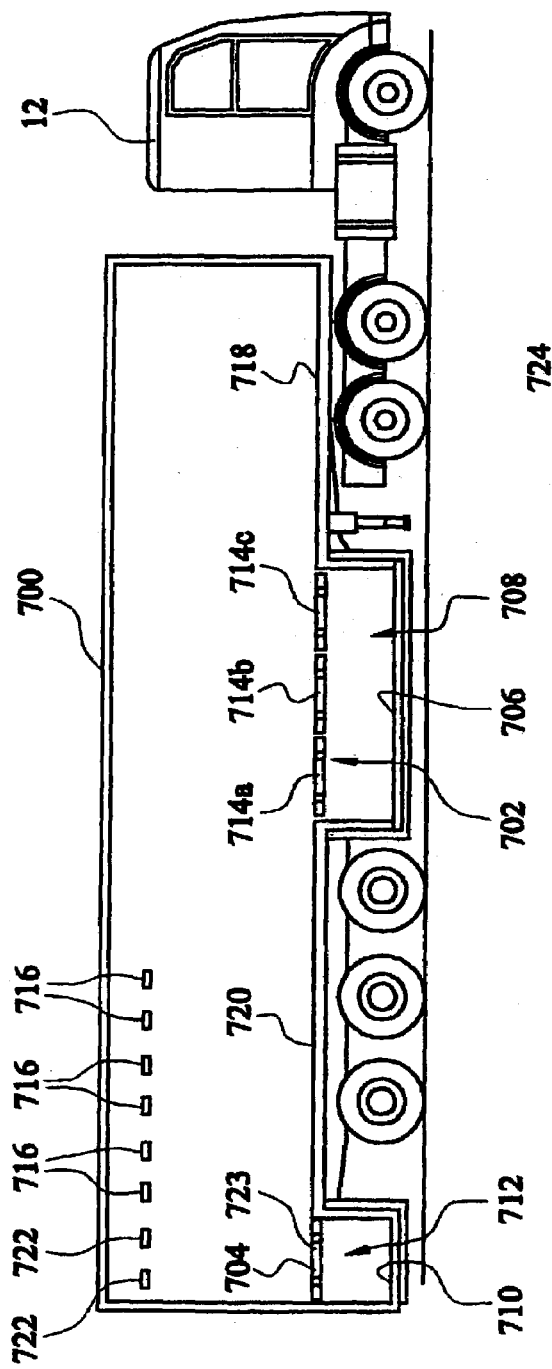
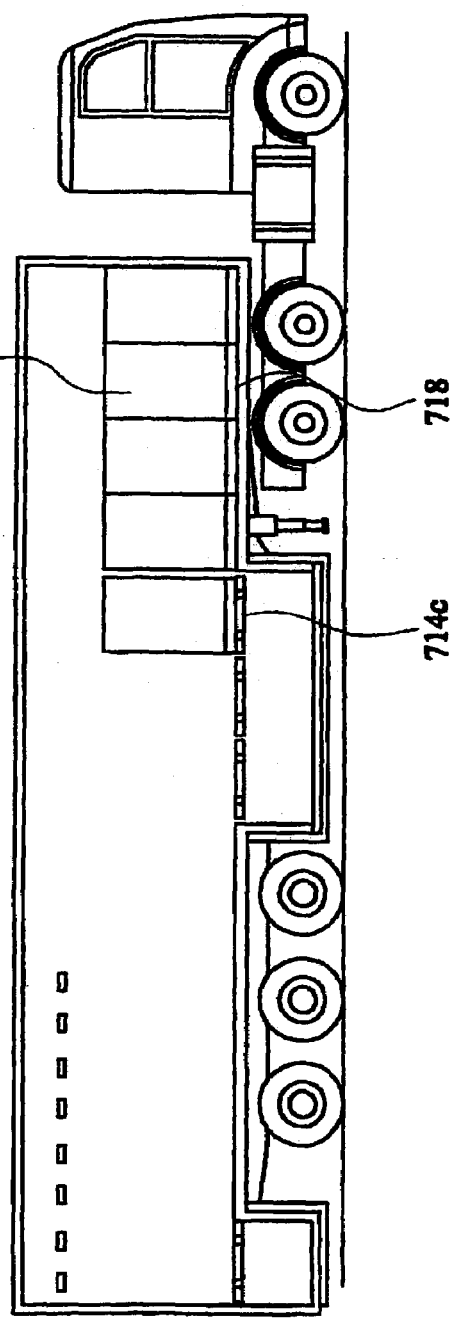

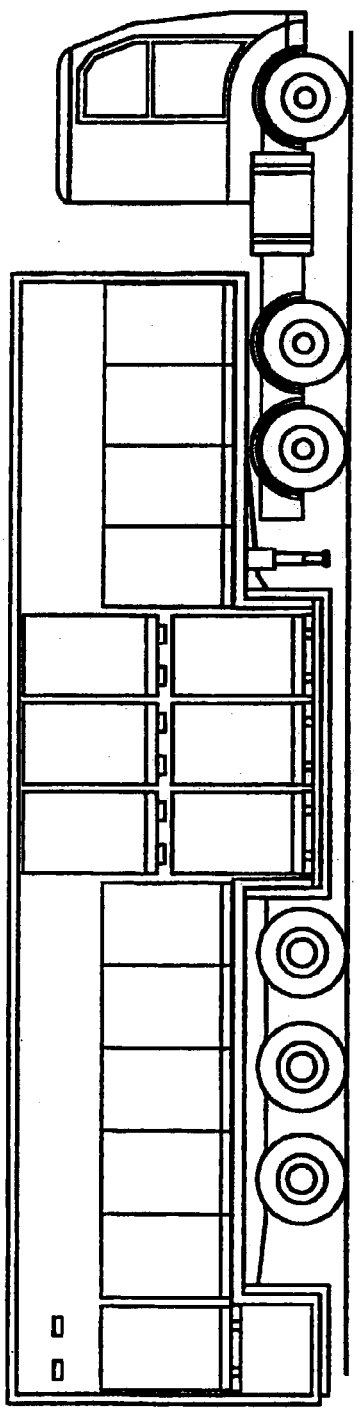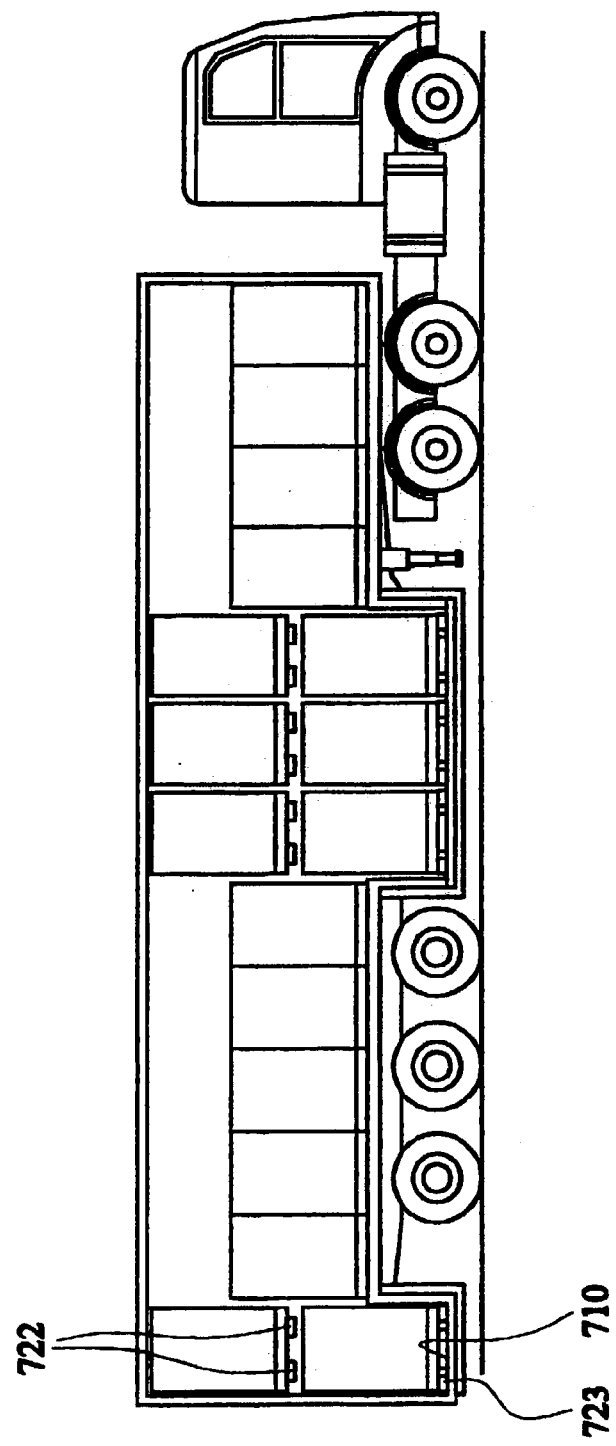

METHODS AND APPARATUS FOR LOADING A TRAILER

FIELD OF THE INVENTION

The present invention relates to trailers for lorries and the like. In particular, although not exclusively, the present invention relates to loading apparatus for trailers and a method of loading trailers comprising said loading apparatus.

BACKGROUND OF THE INVENTION

Conventional trailers are arranged to provide an enclosable space in which goods can be loaded for carriage. The trailers are usually provided by substantially rectangular frames having one or more solid faces. Trailers are commonly mounted on a chassis comprising suitable running gear, to allow for connection of the trailer to a tractor unit for haulage purposes.

Various legal requirements are set for the dimensions and maximum capacity of such trailers.

Conventional loading procedures for trailers include the use of fork lift trucks operated with standard loading bays and dock levellers.

In order to maximise the capacity of a particular size trailer, it is known to lower the base of the trailer between the rear axle and the front hitch of the trailer. Such a modification generally allows additional tiers of goods to be loaded one above the other.

It is an aim of preferred embodiments of the present invention to provide apparatus to facilitate loading of a trailer.

SUMMARY OF THE INVENTION

The present invention provides a loading apparatus for a trailer comprising a platform, which platform, when mounted in a trailer can be moved relative to a floor of the trailer, in order to facilitate loading of goods into the trailer.

The platform may comprise a unitary platform. Alternatively, the platform may comprise a plurality of sections independently moveable of one another.

The loading apparatus may comprise a first platform and a second platform. Suitably, the first platform is situated above the second platform. Suitably, the first platform is spaced from the second platform.

The first platform may be movable independently of the second platform. Alternatively, the first platform and the second platform may be movable as a unit whereby their position relative to one another remains unchanged.

Suitably, movement of the second platform effects movement of the first platform.

The spacing between the first platform and the second platform may remain constant during movement of the loading apparatus along a portion at least of the length of the first and second platforms. Suitably, the spacing between the first platform and the second platform remains constant along substantially the full length of the first and second platforms.

Alternatively, the spacing between a portion at least of the first platform and the second platform may vary during movement of the loading apparatus. The spacing between substantially the full length of the first and second platforms may vary during movement of the loading apparatus.

Suitably, the first platform and the second platform are substantially parallel to each other when said loading apparatus is in a loaded or unloaded condition. The first platform may be substantially parallel to the second platform during loading and unloading of the loading apparatus.

Suitably, the first platform and/or the second platform comprises a supporting surface upon which goods are loaded. The supporting surface may comprise a sheet-like material, a grid-like material, a grill-like material or a combination thereof. Suitable materials for the support surface include metal, wood and plastic. The supporting surface of the first platform may be the same as or different from the supporting surface of the second surface.

The first and/or second platform may comprise a plurality of sections independently moveable of one another.

A proportion at least of the first platform may be provided by a conveyor. Suitably, substantially all of the first platform is provided by a conveyor. A proportion at least of the second platform may be provided by a conveyor. Suitably, substantially all of the second platform is provided by a conveyor. The plurality of sections may provide a single platform or plurality of separate platforms.

A portion at least of the first platform may comprise an angle ledge, preferably, two or more angle ledges. Suitably, substantially all of the first platform is provided by an angle ledge, preferably by two or more angle ledges.

Suitably, the angle ledges are supported above a second platform. Suitably the angle ledges are supported above the side edges of the second platform.

The angle ledges may be supported on a support framework. The support framework may be connected to or independent of the second platform. Alternatively, the angle ledges may be mounted on side walls of a trailer in which the loading apparatus is located.

Suitably, the angle ledges are arranged so as to extend substantially parallel to the floor of a trailer in which the loading apparatus is located. Suitably, the angle ledges are arranged to extend substantially parallel to the side walls of a trailer in which the loading apparatus is located.

The first platform may comprise three or more angle ledges. In this case, one angle ledge is suitably arranged above each side edge of a second platform and the third angle ledge suitably extends therebetween.

Suitably, the third angle ledge is supported by two or more posts. Suitably, the third angle ledge is supported by a post at each end thereof.

Suitably the angle ledges are at least as long as the second platform. The angle ledges maybe longer than the second platform.

The first and/or second platform may comprise one or more support beams. The position of the support beams, in use, may be manually or mechanically adjustable.

Suitably, the first and/or second platform comprises a plurality of support beams. The plurality of support beams may be separate from one another. Alternatively, two or more of the plurality of support beams may be joined together. If any of the support beams are joined together, they are suitably joined together at the ends thereof. Suitably, the support beams are joined together by supporting arms, which also serve to space the support beams transversely from one another.

In use, the support beams may be fixedly positioned in a trailer. Alternatively, in use, the support beams may be moveable between a storage position and a load bearing position. Suitably, in use, the support beams are manually moveable between a storage position and a load bearing position.

In use, the support beams are suitably arranged substantially parallel to one another. In use, the support beams are suitably arranged spaced apart from one another.

The support beams may be supported on a supporting framework, in use. If the loading apparatus comprises a first and/or second platform comprising one or more angle ledges, the supporting framework of the support beams may be provided by the supporting framework of the angle ledges.

Alternatively, in use, the support beams may be mounted on is side walls of a trailed in which the loading apparatus is located.

In use, the supporting beams are suitably arranged to extend substantially parallel to the floor of a trailer in which the loading apparatus is located. Suitably, the supporting beams are arranged in use to extend substantially perpendicular of side walls of a trailer in which the loading apparatus is located.

Suitably, attachment means connects the first platform and the second platform. Suitable attachment means includes a strut extending between the first and second platforms. The strut may be of fixed length. Alternatively, the length of the strut may be variable. Suitably, the attachment means comprises a plurality of struts.

The first platform may be movable substantially perpendicular relative to a trailer floor. The second platform may be movable substantially perpendicular relative to a trailer floor.

The first platform may be movable substantially parallel relative to a trailer floor. The second platform may be movable substantially parallel relative to a trailer floor.

The first platform may be movable diagonally relative to a trailer floor. The second platform may be diagonally movable relative to a trailer floor.

The first platform may be simultaneously movable perpendicular and parallel or perpendicular and diagonally or parallel and diagonally relative to a trailer floor. The second platform may be simultaneously movable perpendicular and parallel or perpendicular and diagonally or parallel and diagonally relative to a trailer floor.

The first platform may be pivotally movable about a fulcrum. The fulcrum may be provided at one end of the first platform. The second platform may be pivotally movable about a fulcrum. The fulcrum may be provided at one end of the second platform.

Movement of the second platform may cause the first platform to pivot about the fulcrum. Alternatively, the first platform may pivot independently of the movement of the second platform.

Guide means may be provided to control the path of movement of the first platform. Guide means may be provided to control the path of movement of the second platform. Separate guide means may be provided for the first platform and for the second platform. Alternatively, unitary guide means may be provided for the first platform and the second platform.

Suitably, the loading apparatus comprises actuation means. Suitably, the actuation means comprises a drive mechanism. The drive mechanism may comprise a motor.

The actuation means may further comprise lifting means to effect movement of the first and/or second platforms. The lifting means is suitably driven by the drive means. The lifting means may be hydraulic lifting means.

The loading apparatus may further comprise a conveyor mountable on the floor of a trailer at the rear end of the trailer. Suitably, the conveyor is mountable substantially level with the floor of the trailer. Alternatively, the conveyor may be mountable spaced above the floor of the trailer.

A conveyor mounted on the floor of a trailer at the rear end of the trailer advantageously aids loading of goods into the trailer.

The present invention further provides a method of loading a trailer comprising a loading apparatus in accordance with the present invention, wherein when the platform is substantially level with the trailer floor, goods are loaded onto the platform, the platform is then moved downwards relative to the trailer floor and further goods are loaded into the trailer.

The method may include loading the goods onto a second platform and then lowering the second platform relative to the floor of the trailer.

The further goods may be loaded onto a first platform, first platform is spaced above a second platform when the second platform has been lowered relative to the floor of the trailer.

The method may include moving the second platform upwards relative to the floor of the trailer in order to bring the second platform substantially level with the floor of the trailer.

Suitably, the second platform is raised to be level with the rear floor of the trailer when the loading apparatus is positioned for loading of the second platform. In this case, a rear edge of the second platform suitably abuts the rear floor of the trailer.

The method may involve moving the first platform upwards when the second platform moves upward and moving the first platform downwards when the second platform is moved downwards.

The method may include loading goods onto substantially the whole of the platform. The method may include loading substantially the whole of the second platform before lowering the second platform and then loading substantially the whole of the first platform.

Alternatively, the method may involve loading a section of the platform and lowering that section of the platform before loading further goods into the trailer.

The method may involve loading a section of the second platform, lowering that section of the second platform then loading a corresponding section of the first platform. In this case, this process may be repeated along the length of the first and second platform until substantially, the whole of the second and first platforms are loaded with goods.

The method may include loading part or all of the second platform then manually positioning part or all of the first platform in the trailer before loading the first platform.

Suitably, the method involves loading goods onto the rear end of the first and/or second platforms. Goods may be moved along the length of the platforms by displacement caused by loading of further goods onto the rear of the platform.

Goods may be loaded onto the first platform such that when the platform is fully loaded, further goods are loaded onto the platform in order to displace goods onto the trailer floor in front of the first platform.

Further goods may be loaded onto the rear floor of the trailer behind the first and second platform. Suitably, the rear floor of the trailer is not loaded with goods until the second platform, the first platform and, if appropriate, the trailer floor in front of the first platform are all fully loaded with goods.

The method may involve loading a first part of a trailer using a first loading apparatus according to the present invention and loading a second part of the trailer using a second loading apparatus according to the present invention.

The first loading apparatus and the second loading apparatus may be separate sets of apparatus. Alternatively, the first loading apparatus and the second loading apparatus may have elements in common.

The present invention yet further provides a trailer comprising a loading apparatus in accordance with the present invention.

Suitably, the trailer comprises a lowered floor in a section of the trailer, which provides a well. The trailer may comprise one or more wells in the floor thereof. Suitably, each of the one or more wells extends across the full width of the trailer floor. Suitably, each of the one or more wells has a substantially constant width along the full length thereof.

The trailer may comprise a single well in a central section of the trailer extending from a rear axle towards the hitching end of the trailer. In this case, the well suitably stops short of the hitching end of the trailer.

The trailer may comprise a single well in a rear section of the trailer extending from behind the rear axle towards the rear end of the trailer. The rear well may extend to the rear end of the trailer or the rear well may stop short of the rear end of the trailer.

The trailer may comprise a first well in a central section and a second well in a rear section of the trailer.

If the trailer comprises a plurality of wells, each well may be provided with a separate loading apparatus. Alternatively, one loading apparatus may be used to load a plurality of wells.

If the loading apparatus comprises a first platform and a second platform, a single first platform may be provided for all of the plurality of wells, whilst separate second platforms are provided for each of the plurality of wells.

The loading apparatus may comprise a unitary first platform and a second platform comprised of a plurality of sections independently moveable of one another, wherein different sections of the second platform are located in different wells of the trailer. In this case, the loading apparatus suitably comprises a single drive mechanism.

If the trailer in which the loading apparatus is located comprises a well in the floor thereof and the first platform comprises three or more angle ledges, the third angle ledge is suitably supported by a post extending from the floor of the trailer, the posts being located at each end of the well. In this case, the posts may extend from within the well, but alternatively extend from the conventional floor level of the trailer.

When the first platform of the loading apparatus comprises one or more angle ledges and the apparatus is located in a trailer, the angle ledges suitably extend from above the rear end of the second platform towards the front, or hitching, end of the trailer. Suitably, the angle ledges extend from above the rear end of the second platform to the front end of the trailer.

If the trailer comprises a plurality of wells in the floor thereof, the angle ledges of the first platform may extend along substantially the full length of the trailer. Alternatively, the angle ledges may extend only along the length of one of the plurality of wells.

If the loading apparatus comprises angle ledges that extend to the front end of the trailer in which it is located, then goods can be loaded in an elevated position on the angle ledges at the front of the trailer. Thus providing an additional storage area between the front floor of the trailer and the angle ledges providing the first platform. Additional goods or equipment, such as refrigeration equipment, may advantageously be stored in this region.

Suitably, the dimensions of the trailer are such that in the region of the one or more wells, standard pallets of 1000 mm×1200 mm×1650 mm may be stacked in at least two tiers.

The trailer may comprise a fixed roof. The trailer may comprise one or more fixed side walls. Alternatively, the trailer may comprise a removable roof and/or one or more removable side walls.

The trailer may comprise insulated walls. The trailer may comprise a refrigeration unit.

The first platform may extend substantially to the front, or hitching, end of the trailer. Alternatively, the first platform may stop short of the front end of the trailer. Suitably, the first platform extends from the hitching end of the trailer to the rear axle of the trailer. The first platform may extend to the rear end of the trailer.

Part or all of the first platform may be moveable between a storage position and a loading position. The first platform may be manually or mechanically moveable between a storage position and a loading position.

Suitably, the second platform extends along the full length of the well in which it is located. If the trailer comprises a plurality of wells, the second platform located in each well may comprise a plurality of sections independently moveable of one another.

Suitably, the first platform and/or the second platform extend across substantially the full width of the trailer.

Suitably, the trailer comprises a drive mechanism to actuate the loading apparatus.

Suitably, the area between the front end of the first platform and the floor of the trailer houses the drive mechanism for the loading apparatus.

If the trailer comprises a refrigeration unit, the refrigeration unit is suitably located between the front end of the first platform and the floor of the trailer.

The first and/or second platform may comprise a conveyor along a proportion at least of the length of the platform. In this case, the goods may be moved along the platform by means of the conveyor.

If one both of the first and second platforms is provided by a plurality of sections independently moveable of one another, then each section may comprise a separate conveyor.

Preferred embodiments of the present invention advantageously provide loading apparatus, which simplifies the loading procedure. Furthermore, the loading apparatus in accordance with preferred embodiments of the invention provide a means of more fully utilising the space within a trailer fitted with the loading apparatus.

BRIEF DESCRIPTION OF THE DRAWINGS

The present invention will now be described, by way of example only, with reference to the following drawings, in which:

FIG. 1 is a schematic side view of a trailer comprising loading apparatus;

FIG. 2 is the trailer of FIG. 1 having the loading apparatus in a different position;

FIGS. 3a–d illustrate the trailer of FIGS. 1 and 2 at different stages of loading;

FIG. 4 is a schematic view of a trailer comprising an alternative loading apparatus;

FIG. 5 shows the trailer of FIG. 4 with the loading apparatus in a different position;

FIGS. 6a–d show the trailer of FIGS. 4 and 5 in various stages of loading;

FIG. 7 shows a schematic illustration of a trailer comprising an alternative loading apparatus;

FIG. 8 is the trailer of FIG. 7 showing the loading apparatus in a different position;

FIGS. 9a–d show the trailer of FIGS. 7 and 8 at various stages of loading;

FIG. 10 is a schematic illustration of a trailer comprising an alternative loading apparatus;

FIG. 11 shows the trailer of FIG. 10 with the loading apparatus in a different position;

FIGS. 12a–d show the trailer of FIGS. 10 and 11 at various stages of loading;

FIGS. 16a–d show the trailer of FIGS. 13, 14, 15a and 15b at various stages of loading;

FIGS. 19a–f show a trailer comprising alternative loading apparatus in various positions.

DESCRIPTION OF THE PREFERRED EMBODIMENTS

Figure 6C:
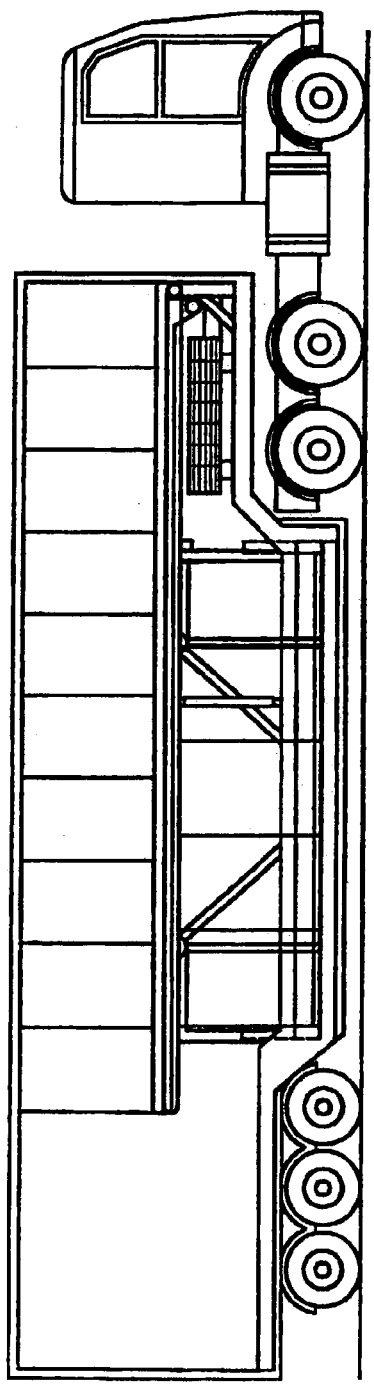

The trailer 2 of FIGS. 1, 2 and 3a–d comprises loading cage 4.

The trailer 2 comprises a lowered floor area 6, which area 6 extends between the rear axle 8 to the hitching point 10 of the tractor unit 12.

The loading cage 4 comprises an upper surface 14 and a lower surface 16. The upper surface 14 extends from the front end of the trailer 2 to stop short of the rear end of the trailer 2, substantially above the rear axle 8.

The lower surface 16 extends along substantially the full length of the lowered floor area 6.

The upper surface 14 and the lower surface 16 are attached to one another by means of a plurality of struts 18. The struts 18 are of fixed length and orientation. Therefore, the spacing between the upper surface 14 and the lower surface 16 remains substantially constant during movement of the loading apparatus 4.

The loading apparatus 4 further comprises lifting means 20 provided by a plurality of hydraulic rams. The lifting means 20 is controlled by drive motor (not shown).

The trailer further comprises refrigeration means 22 located between the upper surface 14 and the front floor of the trailer 24.

To load the trailer 2 of FIGS. 1, 2 and 3a–d, the loading cage 4 is raised upwards by means of the hydraulic rams 20, until the lower surface 16 is substantially level with a rear floor of the trailer 26.

Pallets 28 (see FIG. 3a) are then loaded onto the lower surface 16 by means of a fork lift truck (not shown). When the lower surface 16 is full, the loading cage 4 is lowered until the lower surface 14 is substantially resting on the lowered floor area 6 of the trailer floor (FIG. 3b).

Pallets are then loaded onto the upper surface 14, again using a fork lift truck (not shown). Pallets are loaded on the front edge to the rear edge of the upper surface 14 (FIG. 3c).

When the upper surface 14 is fully loaded, pallets are loaded onto the rear floor 26 of the trailer (FIG. 3d).

Unloading of the trailer is the reverse of the above process.

The upper surface 14 comprises a conveyor 30 to facilitate loading of pallets onto the surface 14.

FIGS. 4, 5 and 6a–d show a trailer 2 attached to a tractor unit 12 as illustrated in the previous figures comprising an alternative loading apparatus 100 according to a second embodiment of the present invention. Like is reference numerals have been used to denote like features.

The loading apparatus 100 comprises an upper platform 102 pivotable at the front end thereof about a fulcrum 106, and a lower platform 104. The lower platform 104 is attached to a support frame 108, which support frame is connected to the side walls (not shown) of the trailer 2.

The lower platform 104 is attached to the support frame 108 by means of hydraulic rams 110. The upper platform 102 is also connected to lifting means 112, provided by another hydraulic ram. The hydraulic rams 110 and 112 are controlled by means of a drive motor (not shown).

In use of the apparatus of FIGS. 4, 5 and 6a–d, the hydraulic ram 112 is extended to raise the upper platform 102 at the same time as the hydraulic rams 110 are contracted to raise the lower platform 104 (FIGS. 5 and 6a). Pallets 114 are then loaded onto the lower platform 104 using a fork lift truck (not shown).

When the lower platform 104 is fully loaded, the hydraulic rams 110 are extended to lower the lower platform 104 into the lowered floor area 6 of the trailer 2. At the same time, the hydraulic ram 112 is contracted to lower the upper platform 102 to a substantially horizontal orientation (FIG. 6b).

Pallets are loaded onto the upper platform 102 by means of a fork lift truck (not shown). The upper platform 102 is provided by a conveyor 116 to facilitate loading of the upper platform 102 to the front edge thereof.

Figure 6D:
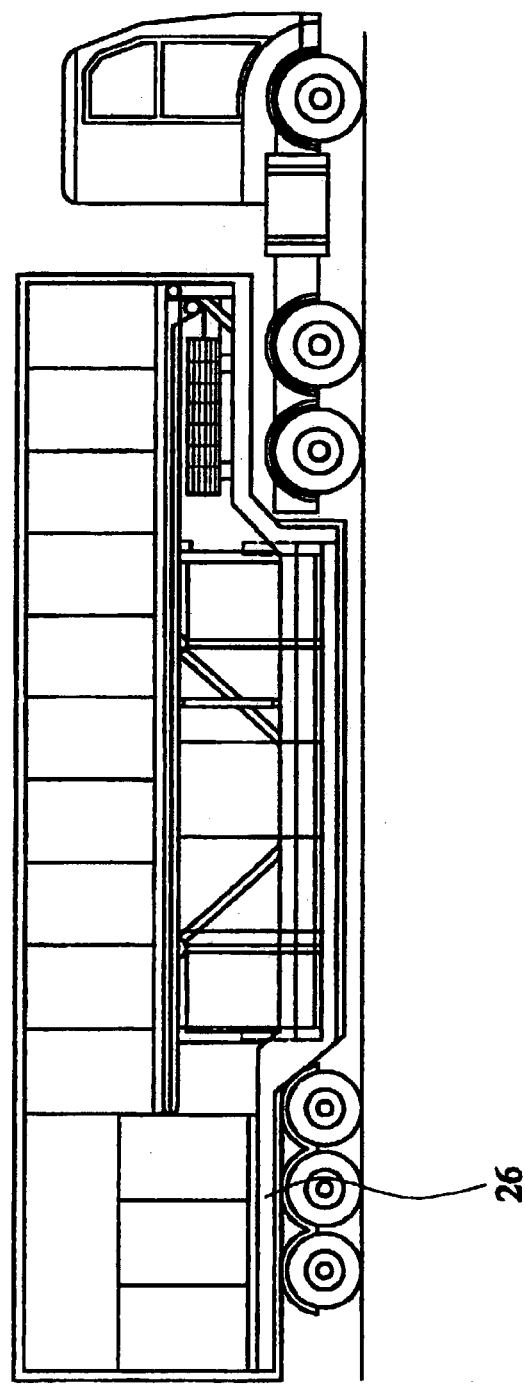

Once the upper platform 102 is fully loaded (FIG. 6c), the rear floor 26 of the trailer 2 is loaded with pallets (FIG. 6d).

Unloading of the trailer 2 is the reverse of the above process.

FIGS. 7, 8 and 9a–d show a trailer 2 attached to a tractor unit 12 as illustrated in the previous figures, comprising an alternative loading mechanism 200 according to a third embodiment of the present invention. Like numerals denote like features.

The loading apparatus 200 of FIGS. 7, 8 and 9a–d comprises an upper platform 202 provided by a conveyor 204. The upper platform 202 is pivotable about fulcrum 206. The loading apparatus 200 further comprises a lower platform 208, which is attached to a support framework 209 by means of hydraulic rams 210. The upper platform 202 is attached to the support framework 209 by means of hydraulic ram 212.

The rear end 214 of the lower platform 208 is guided by channel 216 (indicated by dashed lines).

The front end 218 of the lower platform 208 is pivotally attached to arm 220 of each arm 220 is pivotally attached to the support framework 209.

In loading of the trailer of FIGS. 7, 8 and 9a–d, the hydraulic ram 212 is extended to cause the upper platform 202 to pivot about fulcrum 206. The hydraulic rams 210 then contract to raise the lower platform 208. The pivotably mounted arm 220 and the guide channel 216 cause the lower platform 208 to move simultaneously upwards and rearwards. The lower platform 208 is raised until the rear edge 214 thereof is level with and abutting the rear floor 26 of the trailer (FIG. 8).

Pallets 222 are then loaded (FIG. 9a) onto the lower platform 208 using a fork lift truck (not shown). When the lower platform 208 is fully loaded, the hydraulic rams 210 are extended to lower the lower platform 208 into the lowered floor area 6 of the trailer 2. The hydraulic ram 212 then contracts to lower the upper platform 202 (FIG. 9b).

Figure 9C:
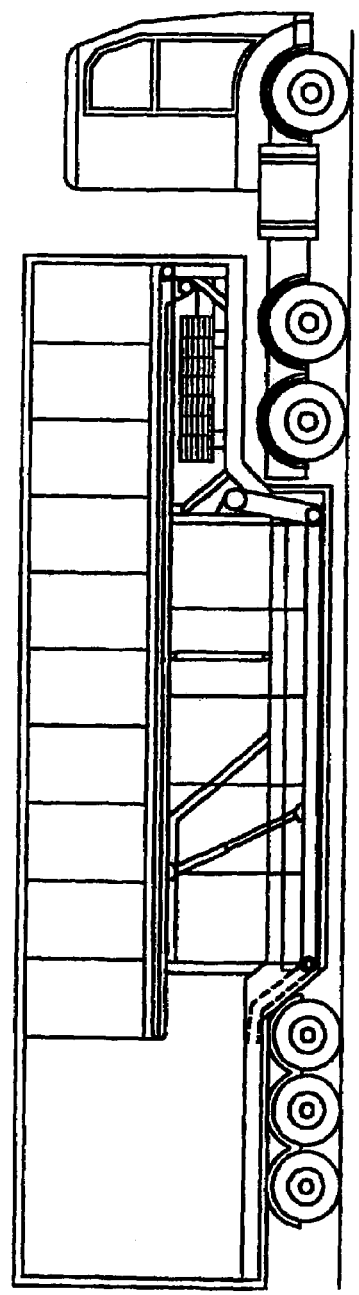

Pallets are then loaded onto the upper platform 202 and the conveyor 204 facilitates loading of the upper platform 202 to the front end thereof (FIG. 9c).

Figure 9D:
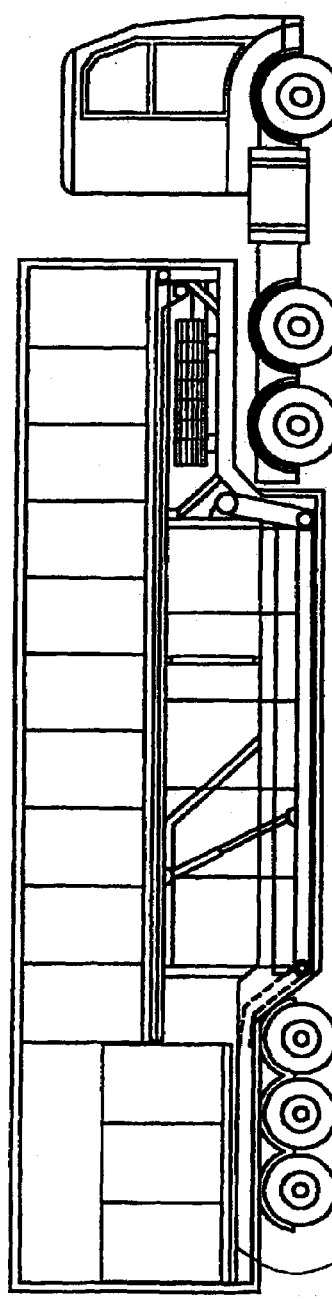

When the upper platform 202 is fully loaded the rear floor 26 of the trailer is loaded (FIG. 9d).

Unloading the trailer is the reverse of the above described process.

FIGS. 10, 11 and 12a–d illustrate the trailer 2 attached to the tractor unit 12 illustrated in the previous figures, comprising an alternative loading apparatus according to a fourth embodiment of the present invention. Like reference numerals are used to denote like features.

The loading apparatus 300 of FIGS. 10, 11 and 12a–d comprises an upper platform 302 provided by a conveyor 304 and pivotally mounted about a fulcrum 306.

The loading apparatus 300 further comprises a lower platform 308 attached to a support framework 310. The lower platform 308 is attached to the support framework 310 by means of hydraulic rams 312. The upper platform 302 is attached to the support framework by means of hydraulic rams 314.

The front end 316 of the lower platform 308 is pivotally mounted of an arm 318, which arm 318 is pivotally mounted of the support framework 310.

The loading apparatus 300 further comprises a floor conveyor 320 extending across substantially the full length of the rear floor 26 of the trailer 2.

When loading the trailer as shown in FIGS. 10, 11 and 12a–d, the hydraulic rams 314 extend to cause the upper platform 302 to pivot about the fulcrum 306.

The hydraulic rams 310 contract to raise the lower platform 308 upwards until the rear edge 322 thereof is abutting and substantially in line with the conveyor 320 (FIG. 11).

Pallets are then loaded onto the floor conveyor 320 and are conveyed onto the lower platform 308 (FIG. 12a). When the lower platform 308 is fully loaded, the rams 310 extend to lower the lower platform 308 into the lowered floor area 6 of the trailer and the rams 314 contract to lower the upper platform 302 (FIG. 12b).

Figure 12C:
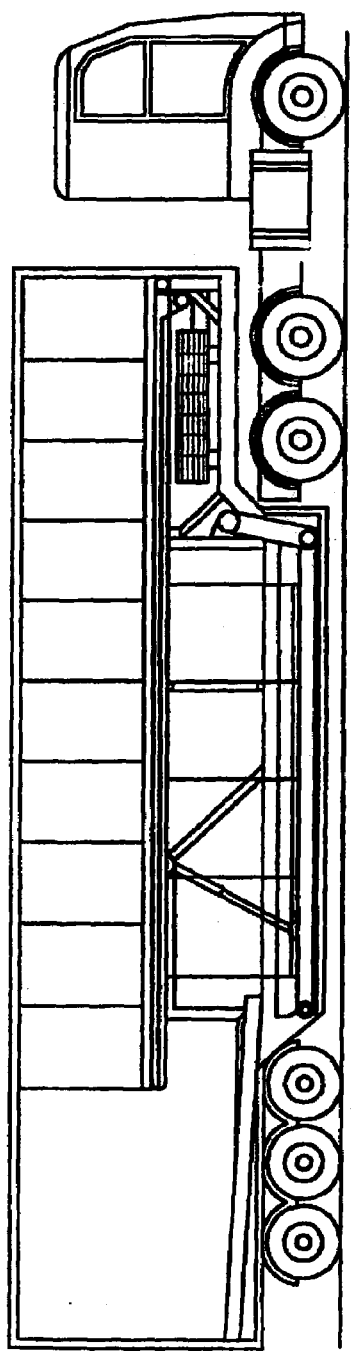
Figure 12D:
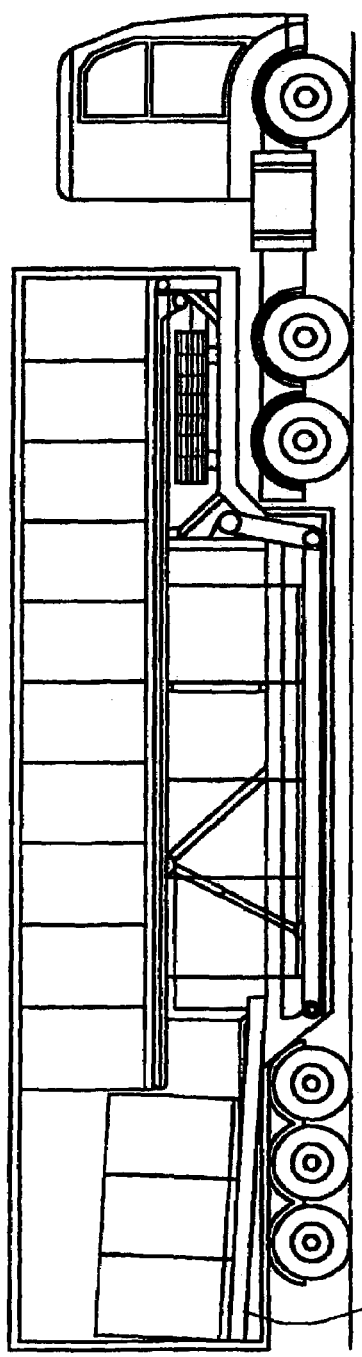
Figure 13:
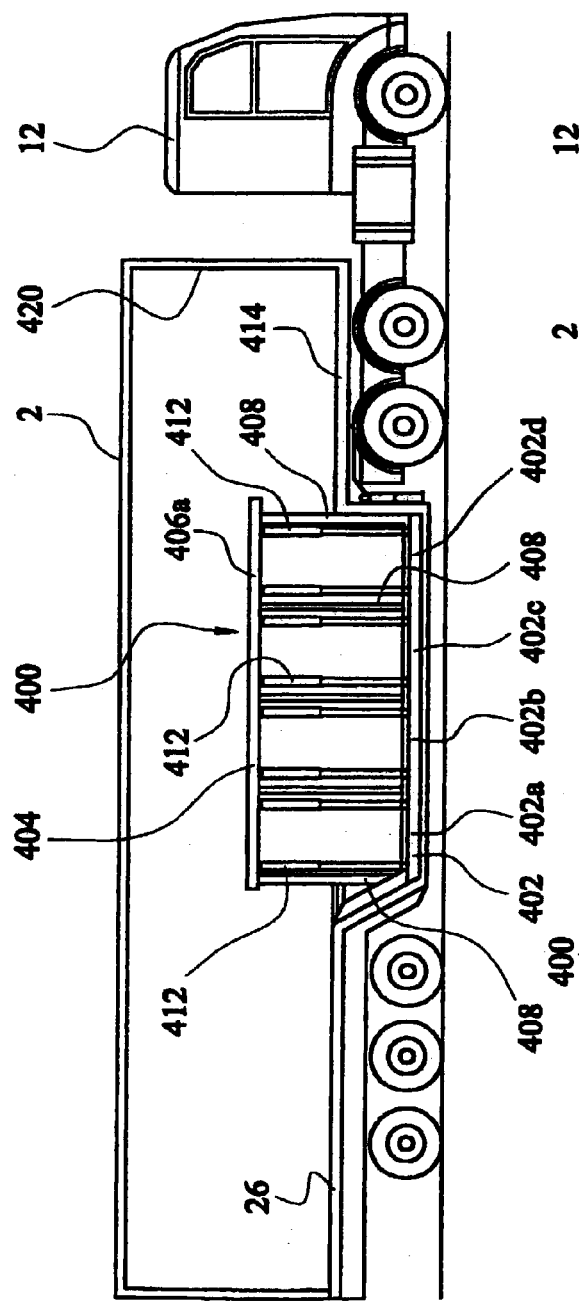
FIG. 13 is a schematic illustration of a trailer comprising an alternative loading apparatus.

Pallets are then loaded onto the upper platform 302 and are conveyed to the front end thereof by means of the conveyor 304 (FIG. 12c). When the upper platform 302 is fully loaded the rear of the trailer 2 is loaded by loading pallets onto the floor conveyor 320 (FIG. 12d).

Unloading the trailer is the reverse of the above procedure.

FIGS. 13, 14, 15a, 15b and 16a–d illustrate the trailer 2 attached to the tractor unit 12 as illustrated in the previous figures, comprising an alternative loading apparatus according to a fifth embodiment of the present invention. Like reference numerals are used to denote like features.

The loading apparatus 400 of FIGS. 13, 14, 15a, 15b and 16a–d comprises a lower platform 402 and an upper platform 404. The lower platform 402 is provided by a plurality of sections 402a, b, c and d, which are independently moveable of one another.

The upper platform 404 comprises three angle ledges 406a,b and c supported above the lower platform 402. Angle ledges 406 and 406c are supported against opposing side walls 407, 409 of the trailer 2. The angle ledges 406a and 406c are supported on a frame provided by legs 408, which legs are attached to the bottom 410 of the well of the trailer 2. The angle ledges 406a and c are arranged substantially against the side walls 407, 409 of the trailer 2, so that only the base of the angle ledges 406a, 406c extend into the interior void of the trailer 2.

Figure 15A:
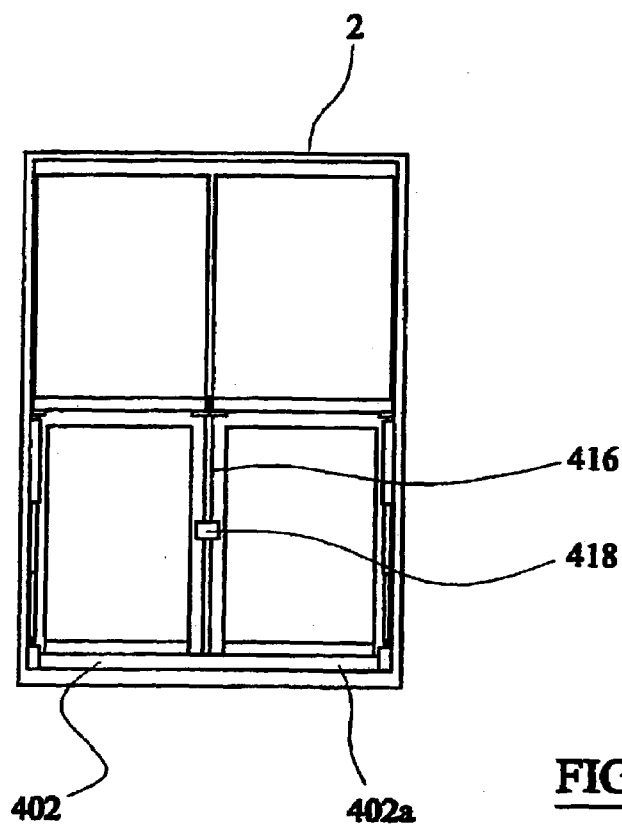
FIGS. 15a and 15b show a cross sectional view of the trailer of FIGS. 13 and 14 in different loading positions.
Figure 15B:
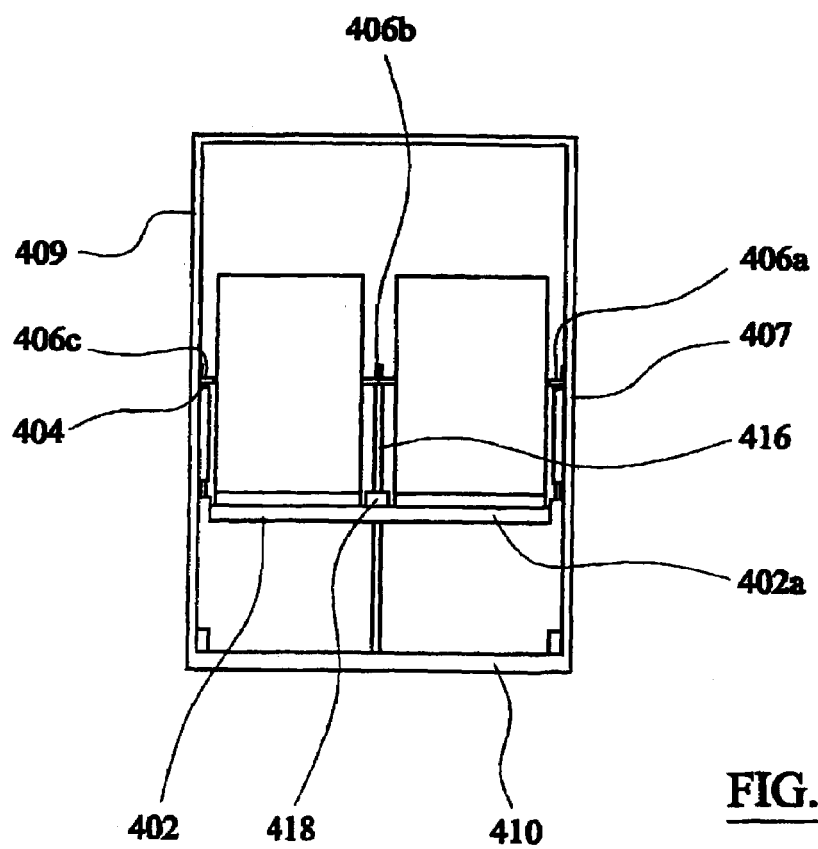

The middle angle ledge 406b extends substantially parallel to and substantially level with angle ledges 406a and 406c. Angle ledge 406b extends substantially down the centre of the void within the trailer (FIGS. 15a and 15b). The middle angle ledge 406b is supported on legs 416 which extend from the floor of the trailer 2. The legs 416 extend from the floor 410 of the well of the trailer. The legs 416 are supported by means of a girder 418 (FIGS. 15a, 15b), which girder is parallel to angel ledge 406b. The girder 418 is located at a level above the maximum level to which the second platform 402 will be raised during loading (FIG. 15b).

The sections 402a–d of the lower platform 402 are attached to the underside of the angle ledges 406 by means of hydraulic rams 412. Each section 402a–d is supported by two hydraulic rams 412 at each side thereof. Each set of hydraulic rams 412 is operable independently of each other set. Thus, allowing independent movement of each section 402a–d of the lower platform 402.

Figure 14:
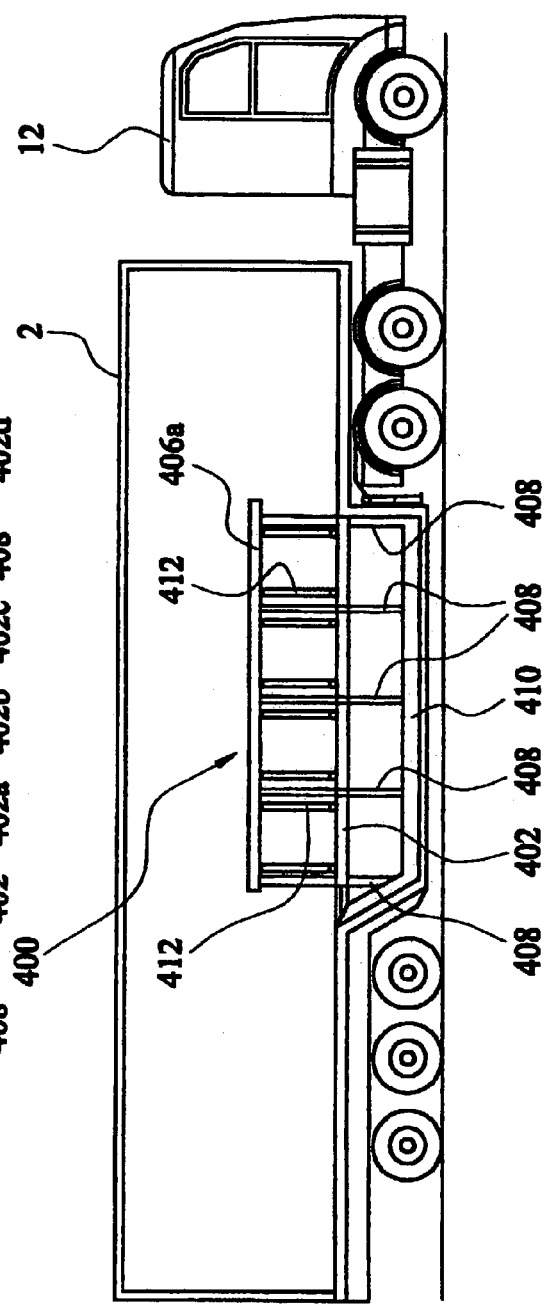
FIG. 14 shows the trailer of FIG. 13 with the loading apparatus in a different position.
Figure 16A:
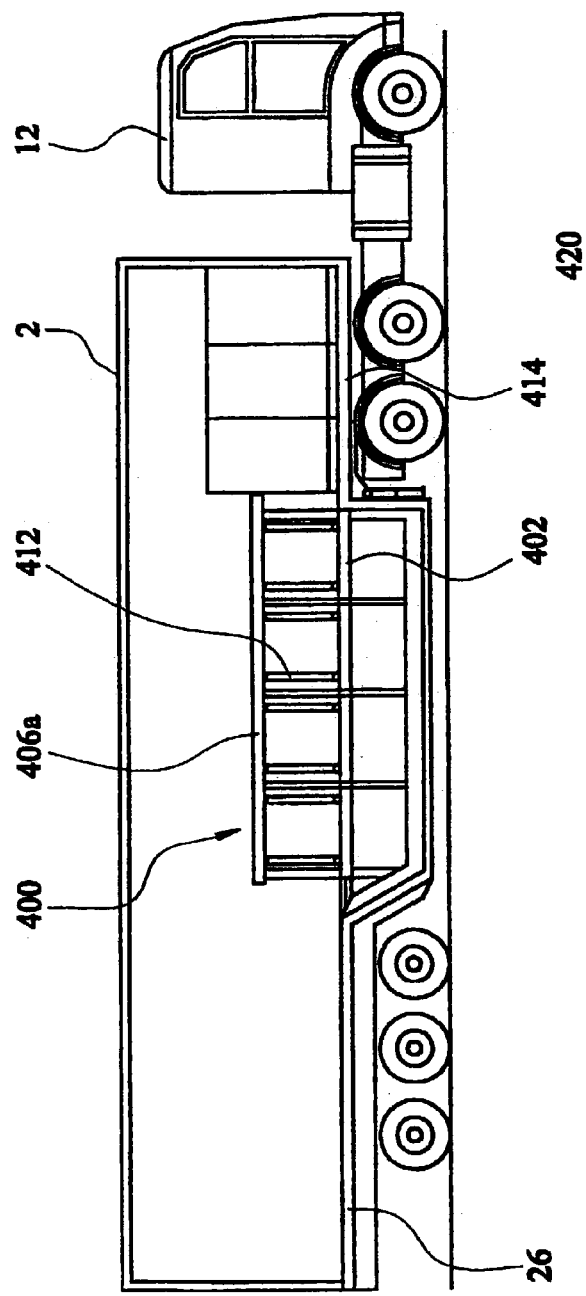

In use of the loading apparatus of FIGS. 13, 14, 15a, 15b and 16a–d, all of the sections 402a–d of the lower platform 402 are raised, either independently or simultaneously, to be level with the rear floor 26 of the trailer (FIGS. 14 and 16a). The front end 414 of the trailer 2 is loaded. Access to the front end 414 is facilitated by the positioning of the lower platform 402. The trailer 2 may be loaded using any appropriate method. If a fork lift truck is used, the fork lift may be driven over the lower platform 402 to allow loading of goods directly onto front end 414 of the trailer 2.

Figure 16B:
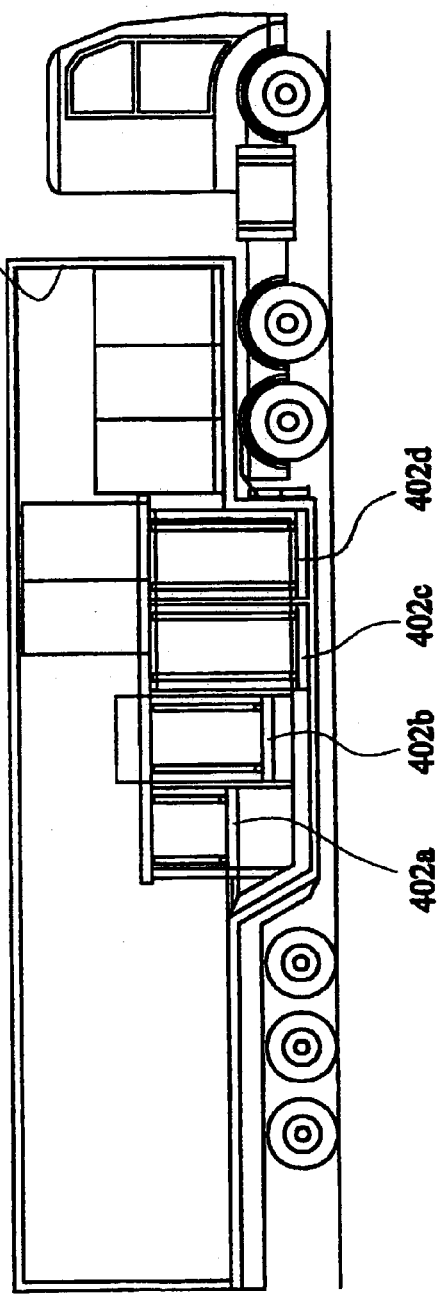

When the front end 414 of the trailer has been loaded, goods are loaded onto the front section 402d of the lower platform 402. The front section 402d is then lowered (FIG. 15b) to allow goods to be loaded onto the front end of the angle ledges 406. The second section 402c of the lower platform 402 is then loaded and lowered into the well 6 in the trailer floor. The next section of the angle ledges 406 is the loaded (FIG. 16b). This loading pattern is repeated until the lower platform 402 and the angle ledges 406 are fully loaded (FIG. 16c). Goods are then loaded onto the rear floor 26 of the trailer (FIG. 16d).

Unloading is the reverse of the above described process.

In an alternative embodiment the angle ledges 406a, b and c extend to the front end 420 of the trailer 2. In this case goods may be loaded on the first platform right up to the front end 420 of the trailer 2. The space between the front end floor 414 of the trailer 2 and the first platform 404 may be used to provide additional storage areas for goods or equipment such as refrigeration equipment.

Figure 17A:
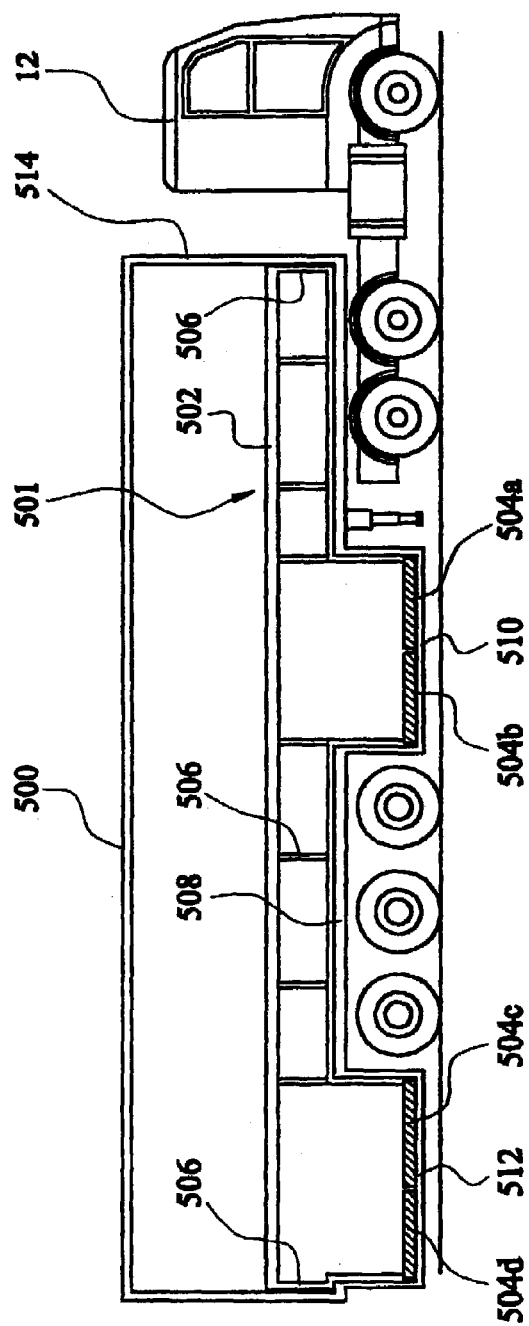
FIGS. 17a–c show an alternative trailer comprising loading apparatus, in various positions.
Figure 17B:
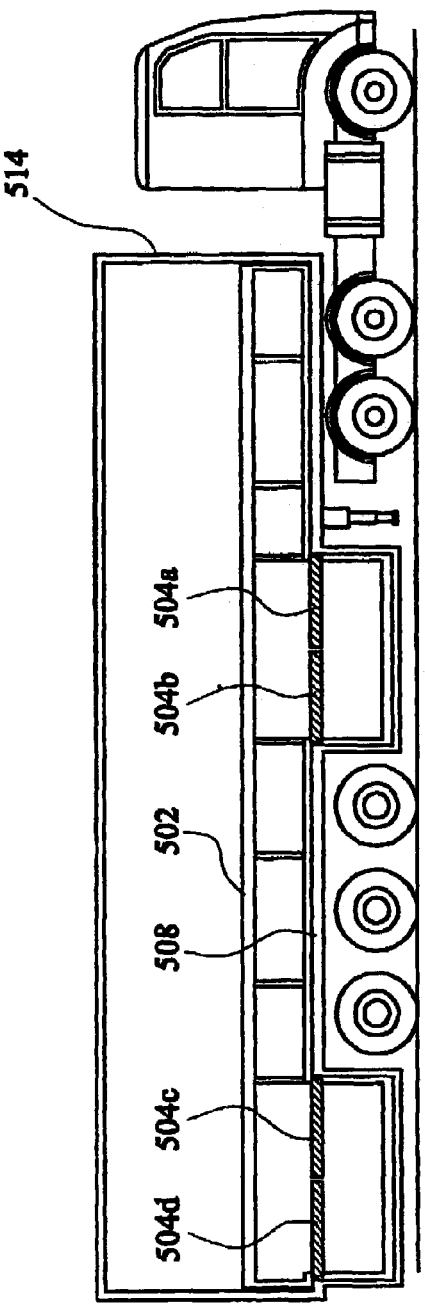
Figure 17C:
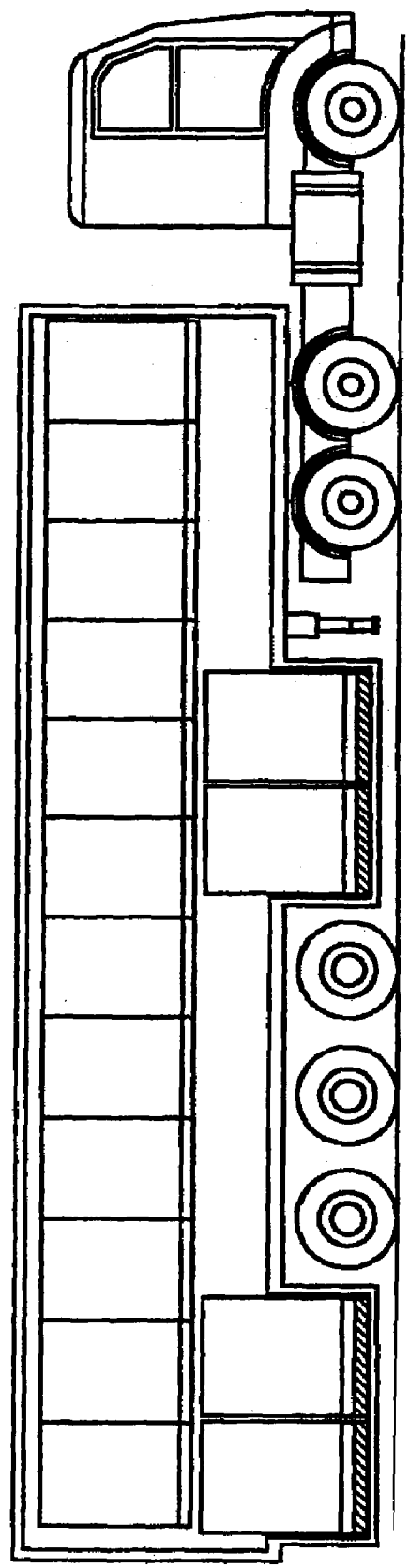

FIGS. 17a–c illustrate a trailer 500 attached to the tractor unit 12 comprising a loading apparatus 501.

The loading apparatus 501 comprises an upper platform 502 provided by a plurality of angle ledges, as per the embodiment of FIGS. 13, 14, 15a, 15b and 16a–d. The loading apparatus 501 further comprises a lower platform provided by sections 504a, 504b, 504c, and 504d. Each section of the lower platforms 504a, 504b, 504c and 504d is independently moveable of the others.

The angle ledges of the upper platform 502 are supported above the lower platform 504 by supporting legs 506, which supporting legs extend from the trailer floor 508.

The trailer floor 508 comprises two lowered sections providing a first well 510 and a second well 512, The lower platform sections 504a–d are attached to the underside of the angle ledges of the upper platform 502 by means of hydraulic rams (not shown). The hydraulic rams are situated in channels in the support legs 506 (not shown) which channels provide guide means for the lower platform sections 504a–d.

In use, all of the lower platform sections 504a–d are moved upwards by means of the hydraulic rams to be level with the trailer floor 508 (as shown in FIG. 17b). Goods may then be loaded onto the upper platform 502 at the hitching end 514 of the trailer 2. When the upper platform 502 has been loaded up to the region of the first well 510, the lower platform sections 504a and 504b in the first well 510 are loaded. The lower platform sections 504a and 504b are lowered once fully loaded to the bottom of the first well 510 and loading of the upper platform 502 continues.

When the upper platform 502 is loaded up to the second well 512 sections 504c and 504d of the lower platform are is loaded. These sections are lowered to the bottom of the second well 512 when fully loaded and loading of the upper platform 502 continues.

FIG. 17c shows the trailer 2 when fully loaded.

Figure 18A:
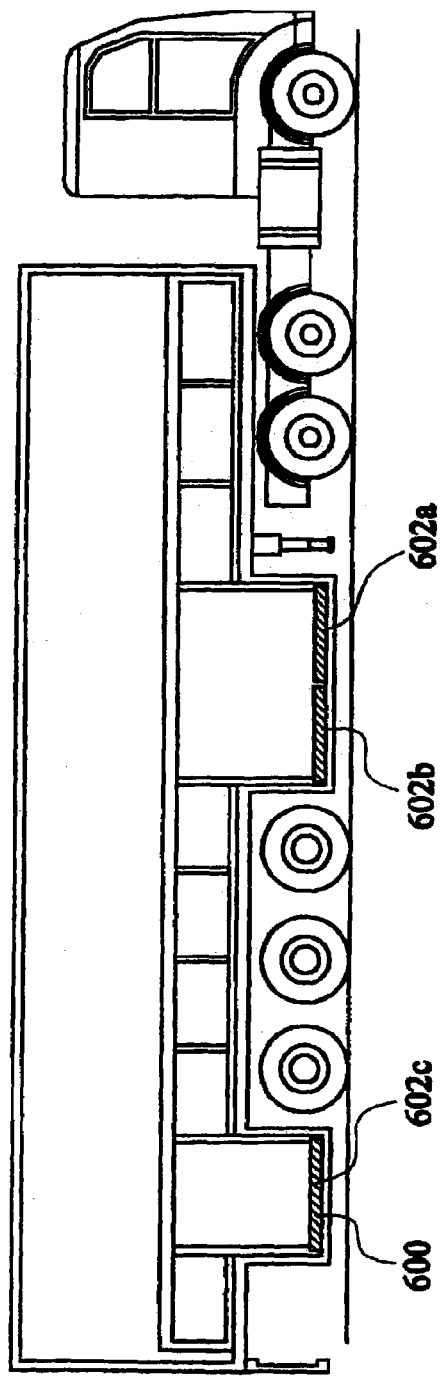
FIGS. 18a–c show another yet further alternative trailer comprising loading apparatus, in various positions

FIGS. 18a, b and c show an alternative trailer design. The design of FIGS. 18a, b and c is essentially the same as FIGS. 17a, b and c except the second well 600 of FIGS. 18a, b and c is smaller than the second well 512 of FIGS. 17a, b and c.

Figure 18B:
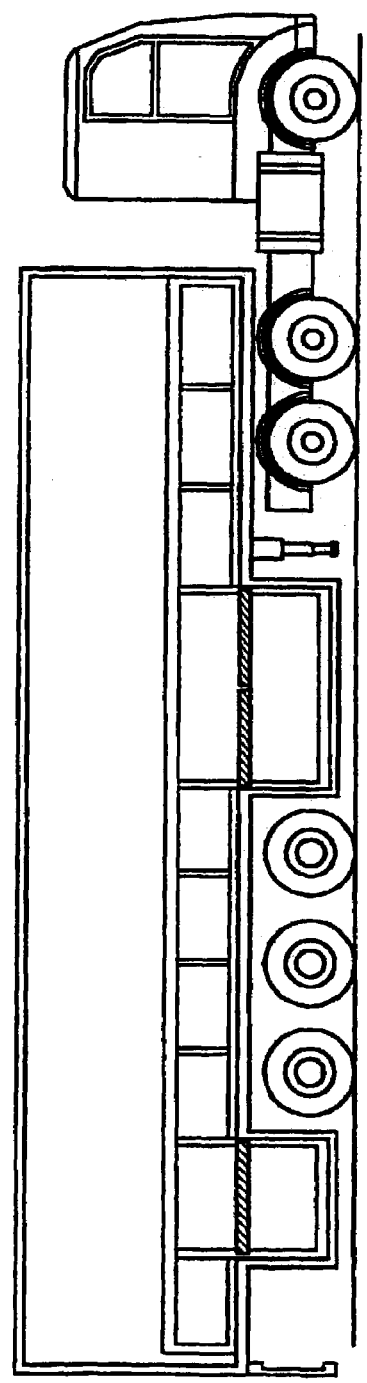
Figure 18C:
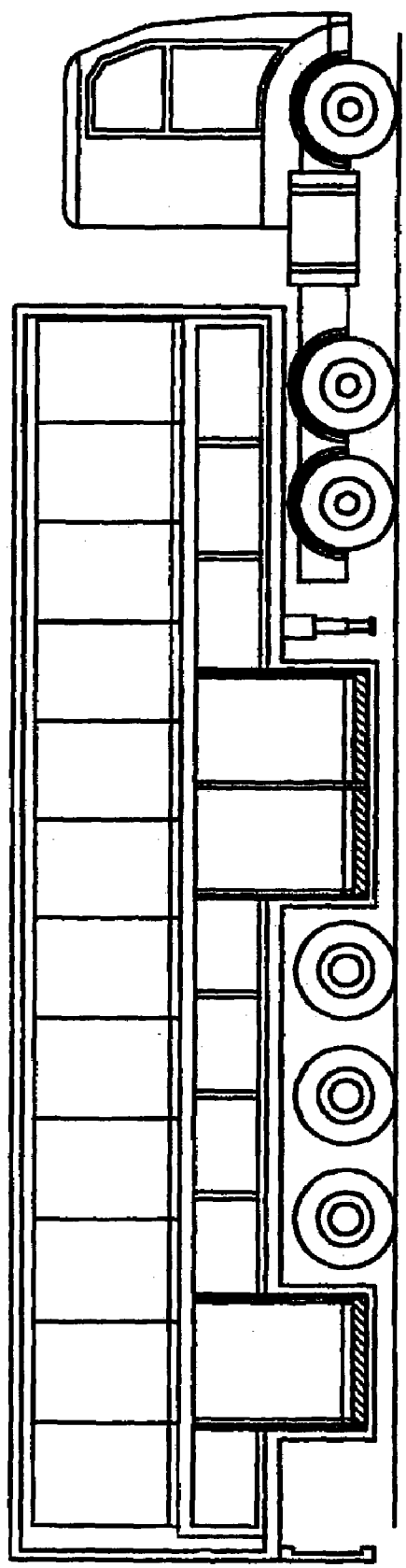

FIG. 18a shows the loading apparatus with the lower platforms 602a, b and c lowered. FIG. 18b shows the loading apparatus with the lower platforms 602a, b and c raised for loading. FIG. 18c, shows the trailer fully loaded.

FIGS. 19a–e show a further embodiment of the present invention, in which a truck 12 is hitched to a trailer 700 comprising first loading apparatus 702 and second loading apparatus 704.

The trailer 700 has a first lowered floor section 706 providing a first well 708 and a second lowered floor section 710 providing a second well 712.

The first loading apparatus 702 comprises a first platform provided by manually adjustable support beams 716 and a plurality of second platform sections 714a–c. The support beams 716 can be removed to a storage position during loading of the front section 718 of the trailer. The storage position (see FIGS. 19a and 19b) is towards the rear of the trailer at an elevation above the floor 720 of the trailer 700 higher than that required by a fork lift truck for loading the trailer 700.

The second loading apparatus comprises a first platform provided by support beams 722, which can also be moved to a storage position during loading of the trailer, and a second platform 723.

To load the trailer 700 (FIG. 19b), the second platform sections 714a–c and 723 are raised to be substantially level with the floor sections 718 and 720 of the trailer 700. Pallets 724 are then loaded, by means of a fork lift truck (not shown) onto the front floor section 718 of the trailer and the adjacent section 714c of the second platform of the first loading apparatus 702.

The loaded section 714c of the second platform of the first loading apparatus 702 is then lowered onto the floor 706 of the well 708. Two support beams 716 are then manually moved from the storage position (see FIGS. 19a and 19b) to a loading position above the loaded section of the second platform 714c. A pallet is then loaded onto the portion of the first platform of the first loading apparatus 702 provided by the support beams 716.

Figure 19C:
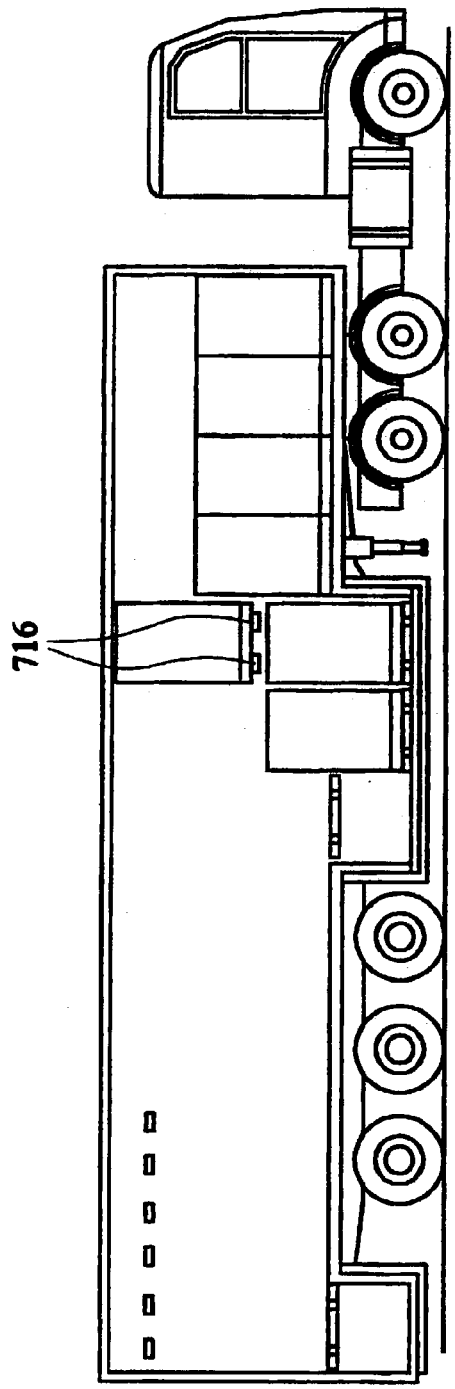
Figure 19D:
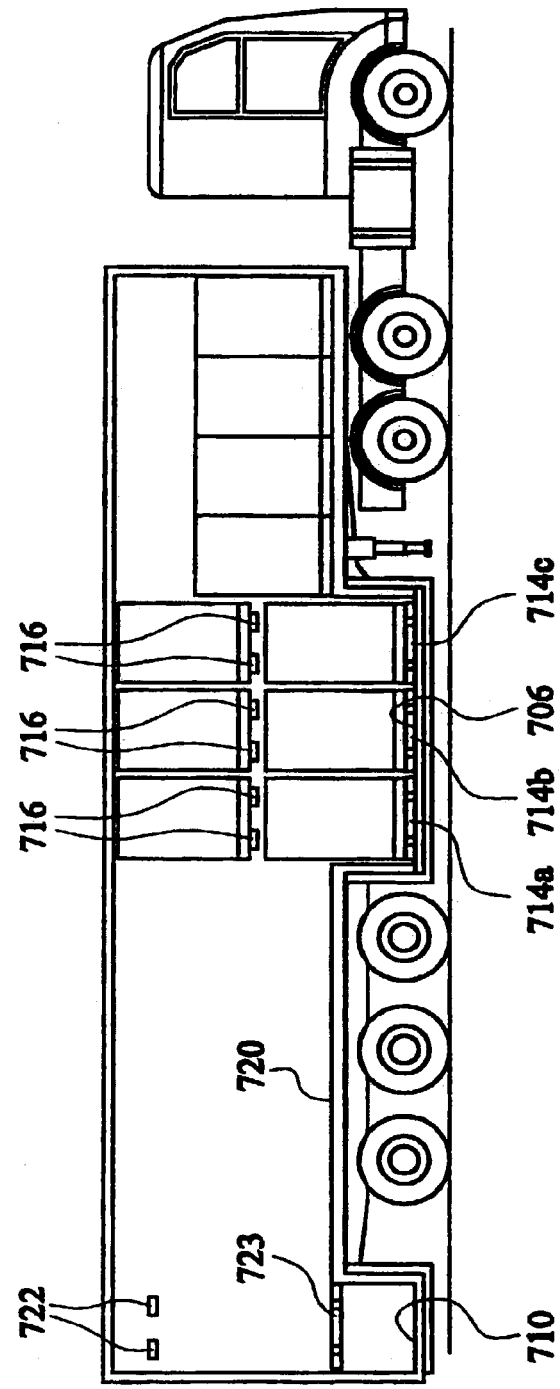

A pallet is then loaded onto the adjacent section 714b of the second platform of the first loading apparatus 702 and this platform section 714b is then lowered to the floor 706 of the well 708. This process is repeated until all of the second 716 and first platform 714a–c of the first loading apparatus 702 has been loaded with pallets (as shown in FIG. 19d).

The floor area 720 of the trailer 700 is then loaded with pallets and the adjacent second platform 723 of the second loading apparatus 704 is also loaded (as shown in FIG. 19e).

Once the second platform 723 of the second loading apparatus 706 has been lowered to the floor 710 of the well 712, the support beams 722 are manually moved from the storage position to a loading position to provide a first platform. A pallet is then loaded onto the second platform to complete loading of the trailer 700.

The reader's attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extend to any novel one, or any novel combination, of the features disclosed in this specification (including any accompanying claims, abstract and drawings), or to any novel one, or any novel combination, of the steps of any method or process so disclosed.

The invention claimed is:

1. A trailer suitable for loading by a fork lift truck, the trailer comprising a forward floor section at a floor height, a rearward floor section at the floor height and a first lowered floor section at a lower height arranged between the forward and rearward floor sections so as to define a well therebetween, a first platform and a second platform, the second platform being movably received in the well and being movable between a platform lower position in which the second platform is positioned between said floor height and said lower height, and a platform upper position in which the second platform is arranged substantially at said floor height, wherein said first and second platforms are capable of carrying a load, the second platform being movable independently of the first platform, wherein the first platform is defined by a plurality of separate support beams, each separate support beam having an upper surface, the upper surfaces combining to define a main surface on which a load is supported, the support beams being separately movable between a storage position and a load-bearing position, the load bearing position of the first platform being above the second platform, the forward and rearward floor sections and the second platform being traversable by a fork lift whereby, with the second platform in the platform upper position and the first platform in the storage position, a fork lift truck may traverse the rearward floor section and second platform to allow lift truck loading access to the forward floor section and, with the second platform in the platform lower position, the first platform may be arranged in the load-bearing position.

2. Apparatus according to claim 1, wherein the first platform is movable independently of the second platform.

3. Apparatus according to claim 1, wherein guide means are provided to control the path of movement of the first or second platform.

4. Apparatus according to claim 1, wherein the support beams in the storage position are spaced horizontally from the second platform.

5. A trailer according to claim 1, wherein a second lowered floor section at a second lower height is arranged rearwardly of the rearward floor section, to define a rear well, a further second platform being movably received in the rear well and being movable between a further platform lower position in which the further second platform is positioned between the second lower height and the floor height, and a further platform upper position in which the further second platform is arranged substantially at said floor height, the further second platform being traversable by a fork lift truck when in the further platform upper position.

* * * * *